US011165621B2

(12) United States Patent
Konishi et al.

(10) Patent No.: US 11,165,621 B2
(45) Date of Patent: Nov. 2, 2021

(54) DOPPLER SHIFT CORRECTION IN THREE-DIMENSIONAL NETWORK

(71) Applicant: SoftBank Corp., Tokyo (JP)

(72) Inventors: Mitsukuni Konishi, Tokyo (JP); Atsushi Nagate, Tokyo (JP); Yoshichika Ota, Tokyo (JP); Kenji Hoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/959,694

(22) PCT Filed: Dec. 21, 2018

(86) PCT No.: PCT/JP2018/047241
§ 371 (c)(1),
(2) Date: Jul. 6, 2020

(87) PCT Pub. No.: WO2019/135368
PCT Pub. Date: Jul. 11, 2019

(65) Prior Publication Data
US 2021/0083917 A1 Mar. 18, 2021

(30) Foreign Application Priority Data
Jan. 5, 2018 (JP) .............................. JP2018-000879

(51) Int. Cl.
*H04L 27/26* (2006.01)
*H04B 7/185* (2006.01)
*H04W 84/06* (2009.01)

(52) U.S. Cl.
CPC ..... *H04L 27/2657* (2013.01); *H04B 7/18508* (2013.01); *H04L 27/2675* (2013.01); *H04W 84/06* (2013.01)

(58) Field of Classification Search
CPC .............. H04W 72/042; H04W 84/06; H02L 27/2657; H04B 7/18508; H04L 27/2675
See application file for complete search history.

(56) References Cited

U.S. PATENT DOCUMENTS 6,675,013 B1 * 1/2004 Gross ................. H04B 7/18504
455/11.1
2011/0116386 A1 5/2011 Blanchard et al.
(Continued)

FOREIGN PATENT DOCUMENTS

JP 2001-522191 A 11/2001
JP 2004-500786 A 1/2004
(Continued)

*Primary Examiner* — Sung S Ahn
(74) *Attorney, Agent, or Firm* — Muirhead and Saturnelli, LLC

(57) ABSTRACT

In a mobile communication system using a mobile-type radio relay apparatus that forms a plurality of cells toward the ground or the sea while moving in an upper airspace, a deterioration in communication quality, which is caused by a Doppler shift of a reception signal due to a relative movement of a radio relay apparatus with respect to a terminal apparatus of each of a plurality of cells or a feeder station on the ground or on the sea, is suppressed. The communication system comprises a mobile-type radio relay apparatus that is disposed movably by flying in an upper airspace, forms a plurality of cells from an antenna at a predetermined altitude toward the ground or the sea, and performs a radio communication with a terminal apparatus located in each of the plurality of cells. The communication system comprises an estimation section for estimating a Doppler shift in at least one of a radio communication of a service link between the terminal apparatus located in the cell and the radio relay apparatus and a radio communication of a feeder link between the radio relay apparatus and a feeder station on the ground or on the sea, and a correction (Continued)

section for correcting a frequency of the at least one radio communication based on an estimation result of the Doppler shift.

36 Claims, 25 Drawing Sheets

(56) References Cited

U.S. PATENT DOCUMENTS

| | | | |
|---|---|---|---|
| 2013/0324070 A1 | 12/2013 | Bennett et al. | |
| 2017/0235316 A1* | 8/2017 | Shattil | B64C 39/024 701/3 |
| 2017/0257149 A1 | 9/2017 | Axmon et al. | |

FOREIGN PATENT DOCUMENTS

| | | |
|---|---|---|
| JP | 2008-537388 A | 9/2008 |
| WO | WO 02/01750 A2 | 1/2002 |
| WO | WO 02/01750 A3 | 1/2002 |
| WO | WO 2016/135947 A1 | 9/2016 |
| WO | WO 2017/076550 A1 | 5/2017 |

\* cited by examiner

DOPPLER SHIFT CORRECTION IN THREE-DIMENSIONAL NETWORK

TECHNICAL FIELD

The present invention relates to a radio relay apparatus and a communication system capable of forming a three-dimensional cell.

BACKGROUND ART

When a terminal apparatus (mobile station) transmits or receives a signal for a radio relay apparatus (base station) of a mobile communication system, while moving, a frequency shift due to a Doppler phenomenon (hereinafter "Doppler shift") occurs in a frequency of a reception signal. The frequency error of the reception signal accompanying this Doppler shift may affect a communication quality. Patent Literature 1 discloses a user terminal (terminal apparatus) that estimates the Doppler shift using a known signal such as a pilot signal from a base station, and corrects a frequency of a reception signal based on the estimation result.

There is also known a radio relay apparatus for forming a plurality of cells formed by a plurality of beams having directivity in different directions and performs radio communications with a plurality of terminal apparatuses located in each of the cells.

CITATION LIST

Patent Literature

Patent Literature 1: Japanese Unexamined Patent Application Publication (Translation of PCT Application) No. 2008-537388.

SUMMARY OF INVENTION

Technical Problem

As the radio relay apparatus that forms the plurality of cells, for example, there is a mobile-type radio relay apparatus that forms a plurality of cells toward the ground while moving in an upper airspace, such as a satellite station installed in an artificial satellite. In a mobile communication system using this mobile-type radio relay apparatus, there is a possibility that a communication quality may be deteriorated due to the Doppler shift of a reception signal due to a relative movement of the radio relay apparatus with respect to a terminal apparatus of each of the plurality of cells.

In particular, in a radio communication of a service link between the terminal apparatus and the radio relay apparatus and a radio communication of a feeder link between the radio relay apparatus and a feeder station on the ground or on the sea, when a high frequency exceeding several tens of GHz is used, there is a possibility that the Doppler shift becomes larger than a compensable range in the terminal apparatus and a predetermined communication quality cannot be obtained.

In addition, depending on a positional relationship between the mobile-type radio relay apparatus and each of the cells, since a cell including a terminal apparatus approaching the radio relay apparatus and a cell including a terminal apparatus far from the radio relay apparatus are mixed, a plurality of cells having different directions and velocities of relative movement of the terminal apparatuses with respect to the radio relay apparatus may coexist. In this case, depending on the cell, there is a possibility that the Doppler shift becomes large and a predetermined communication quality cannot be obtained.

Furthermore, in a uplink where the radio relay apparatus forming the plurality of cells receives signals from the terminal apparatus, due to the Doppler shift of the reception signal caused by the relative movement of the radio relay apparatus with respect to the terminal apparatus of each of the plurality of cells, there is a possibility that the frequencies of the uplink reception signals that are received by the radio relay apparatus from the terminal apparatus partially overlaps between the cells and an interference occurs.

Solution to Problem

A communication system according to an aspect of the present invention is a communication system comprising a mobile-type radio relay apparatus that is disposed movably by flying in an upper airspace, forms a plurality of cells from an antenna at a predetermined altitude toward the ground or the sea, and performs a radio communication with a terminal apparatus located in each of the plurality of cells. The communication system comprises an estimation section for estimating a Doppler shift in at least one of a radio communication of a service link between the terminal apparatus located in the cell and the radio relay apparatus and a radio communication of a feeder link between the radio relay apparatus and a feeder station on the ground or on the sea, and a correction section for correcting a frequency of the at least one of the radio communications based on an estimation result of the Doppler shift.

A radio relay apparatus according to another aspect of the present invention is a mobile-type radio relay apparatus that is disposed movably by flying in an upper airspace, forms a plurality of cells from an antenna at a predetermined altitude toward the ground or the sea, and performs a radio communication with a terminal apparatus located in each of the plurality of cells. The mobile-type radio relay apparatus comprises an estimation section for estimating a Doppler shift in at least one of radio communications of a service link between the terminal apparatus located in the cell and the radio relay apparatus, and a radio communication of a feeder link between the radio relay apparatus and a feeder station on the ground or on the sea, and a correction section for correcting a frequency of the at least one of the radio communications based on the an estimation result of the Doppler shift.

The estimation section or the correction section may determine a frequency offset for a radio communication of at least one of an uplink and a downlink of the feeder link based on the estimation result of the Doppler shift, and the correction section may apply the frequency offset to the frequency of the radio communication. The correction section may be provided in the feeder station or the radio relay apparatus.

The estimation section or the correction section may determine a frequency offset for a radio communication of at least one of an uplink and a downlink of the service link for each of the cells, based on the estimation result of the Doppler shift, and the correction section may apply the frequency offset to the frequency of the radio communication for each of the cells.

The estimation section or the correction section may determine a frequency offset for a radio communication of at least one of an uplink and a downlink of the feeder link, and may determine a frequency offset for a radio communication of at least one of an uplink and a downlink of the service link for each of the cells, and the correction section may apply the frequency offset of the feeder link to a frequency of the radio communication of at least one of the uplink and the downlink of the feeder link, and may apply the frequency offset of the service link to a frequency of the radio communication of at least one of the uplink and the downlink of the service link for each of the cells.

The correction section may be provided in the radio relay apparatus.

The estimation section may estimate a shape of the cell based on map information and an antenna directivity pattern of the radio relay apparatus, and may estimate the Doppler shift of the service link with respect to a geometric center point in the estimated shape of the cell. And, the correction section may correct the frequency of the radio communication in the service link between the terminal apparatus located in the cell and the radio relay apparatus, based on the estimation result of the Doppler shift of the service link which is estimated with respect to the geometric center point of the cell.

The estimation section may estimate a center value of position distributions of a plurality of terminal apparatuses in the cell based on statistical index values of current position information of the plurality of terminal apparatuses in the cell, and may estimate the Doppler shift of the service link with respect to the estimated center value of the position distributions of the plurality of terminal apparatuses. And, the correction section may correct the frequency of the radio communication in a service link between the terminal apparatus located in the cell and the radio relay apparatus, based on the estimation result of the Doppler shift of the service link, which is estimated for the center value of the position distributions of the plurality of terminal apparatuses in the cell.

The estimation section may estimate the Doppler shift of the service link based on an uplink reference signal transmitted from the terminal apparatus for each of a plurality of terminal apparatuses located in the cell. And, the correction section may correct the frequency of the radio communication in a service link between the terminal apparatus located in the cell and the radio relay apparatus, based on the statistical index value of the estimation value of the Doppler shift of the service link, which is estimated for the plurality of terminal apparatuses.

The estimation section may estimate the Doppler shift in the at least one of the radio communication of the service link and the radio communication of the feeder link based on flight schedule information predetermined for the radio relay apparatus.

A communication system according to another aspect of the present invention is a communication system comprising a radio relay apparatus that forms a plurality of cells from an antenna at a predetermined altitude toward the ground or the sea and performs radio communication with a terminal apparatus located in each of the plurality of cells. The communication system comprises an estimation section for estimating a Doppler shift in a radio communication between the terminal apparatus and the radio relay apparatus for each of a plurality of terminal apparatuses located in the plurality of cells, and a correction section for correcting a frequency of the radio communication between the terminal apparatus and the radio relay apparatus based on an estimation result of the Doppler shift for each of the plurality of terminal apparatuses.

A radio relay apparatus according to still another aspect of the present invention is a radio relay apparatus that forms a plurality of cells from an antenna at a predetermined altitude toward the ground or the sea, and performs a radio communication with a terminal apparatus located in each of the plurality of cells. The radio relay apparatus comprises an estimation section for estimating a Doppler shift in a radio communication between the terminal apparatus and the radio relay apparatus for each of a plurality of terminal apparatuses located in the plurality of cells, and a correction section for correcting a frequency of a radio communication between the terminal apparatus and the radio relay apparatus based on an estimation result of the Doppler shift for each of the plurality of terminal apparatuses. The radio relay apparatus may be provided in a movable flying object that flies in an upper airspace.

The correction section may determine an uplink resource allocation of the terminal apparatus so that uplink signals between the plurality of terminal apparatuses do not interfere with each other on a frequency axis due to the Doppler shift, based on the estimation result of the Doppler shift.

The estimation section or the correction section may determine a frequency offset for a frequency of an uplink radio communication of the service link between the terminal apparatus and the radio relay apparatus, based on the estimation result of the Doppler shift, and the correction section may apply the frequency offset to the frequency of the uplink radio communication.

A communication system according to still another aspect of the present invention is a communication system comprising a radio relay apparatus that forms a plurality of cells from an antenna at a predetermined altitude toward the ground or the sea and performs a radio communication with a terminal apparatus located in each of the plurality of cells. The communication system comprises an estimation section for estimating a Doppler shift in a radio communication of a service link between the terminal apparatus and the radio relay apparatus for each of a plurality of terminal apparatuses located in the plurality of cells and grouping the plurality of terminal apparatuses according to a shift amount and a shift direction of a Doppler shift of each terminal apparatus and a correction section for correcting a frequency in a radio communication of a service link between the terminal apparatus included in a terminal group and the radio relay apparatus for each terminal group, based on the estimation result of the Doppler shift for each of a plurality of terminal groups.

A radio relay apparatus according to still another aspect of the present invention is a radio relay apparatus that forms a plurality of cells from an antenna at a predetermined altitude toward the ground or the sea, and performs a radio communication with a terminal apparatus located in each of the plurality of cells. The radio relay apparatus comprises an estimation section for estimating a Doppler shift in a radio communication of a service link between the terminal apparatus and the radio relay apparatus for each of a plurality of terminal apparatuses located in the plurality of cells and grouping the plurality of terminal apparatuses according to a shift amount and a shift direction of the Doppler shift of each terminal apparatus, and a correction section for correcting a frequency of a radio communication between the terminal apparatus included in a terminal group and the radio relay apparatus for each terminal group, based on an estimation result of the Doppler shift for each of a plurality of terminal groups.

The radio relay apparatus may be provided in a movable flying object that flies in an upper airspace.

The correction section may determine a resource allocation of an uplink from the terminal apparatus of the terminal group so that uplink signals between the plurality of terminal groups do not interfere with each other on a frequency axis due to the Doppler shift based on the estimation result of the Doppler shift.

The estimation section or the correction section may determine a frequency offset for an uplink radio communication of a service link between the terminal apparatus of the terminal group and the radio relay apparatus, based on the estimation result of the Doppler shift, and the correction section may apply the frequency offset to a frequency of the uplink radio communication.

The correction section may correct the frequency of the radio communication of the service link between the terminal apparatus and the radio relay apparatus, based on flight schedule information predetermined for the radio relay apparatus.

The estimation section may estimate the Doppler shift based on at least one kind of information among information on a frequency shift of a downlink signal transmitted to the terminal apparatus via the radio relay apparatus, information on a directivity of an antenna forming the cell, information on a frequency shift of an uplink signal transmitted from the terminal apparatus via the radio relay apparatus, information on a time of changing position information of the radio relay apparatus, and flight schedule information predetermined for the radio relay apparatus.

The radio relay apparatus may be a slave repeater for performing a radio communication with a master repeater on the ground or on the sea, wherein the master repeater is connected to a base station of a mobile-communication, and each of the estimation section and the correction section may be provided in the master repeater on the ground or on the sea, the slave repeater or the base station.

The radio relay apparatus may be a base station of a mobile communication, and each of the estimation section and the correction section may be provided in the base station.

Advantageous Effects of Invention

According to the present invention, in a mobile-type radio relay apparatus that forms a plurality of cells toward the ground or the sea while moving in an upper airspace and a communication comprising the mobile-type radio relay apparatus, it is possible to suppress a deterioration in communication quality, which is caused by a Doppler shift of a reception signal due to a relative movement of the radio relay apparatus with respect to a terminal apparatus of each of the plurality of cells and/or a feeder station on the ground or on the sea.

DESCRIPTION OF EMBODIMENTS

Hereinafter, embodiments of the present invention will be described with reference to the drawings.

Figure 1:
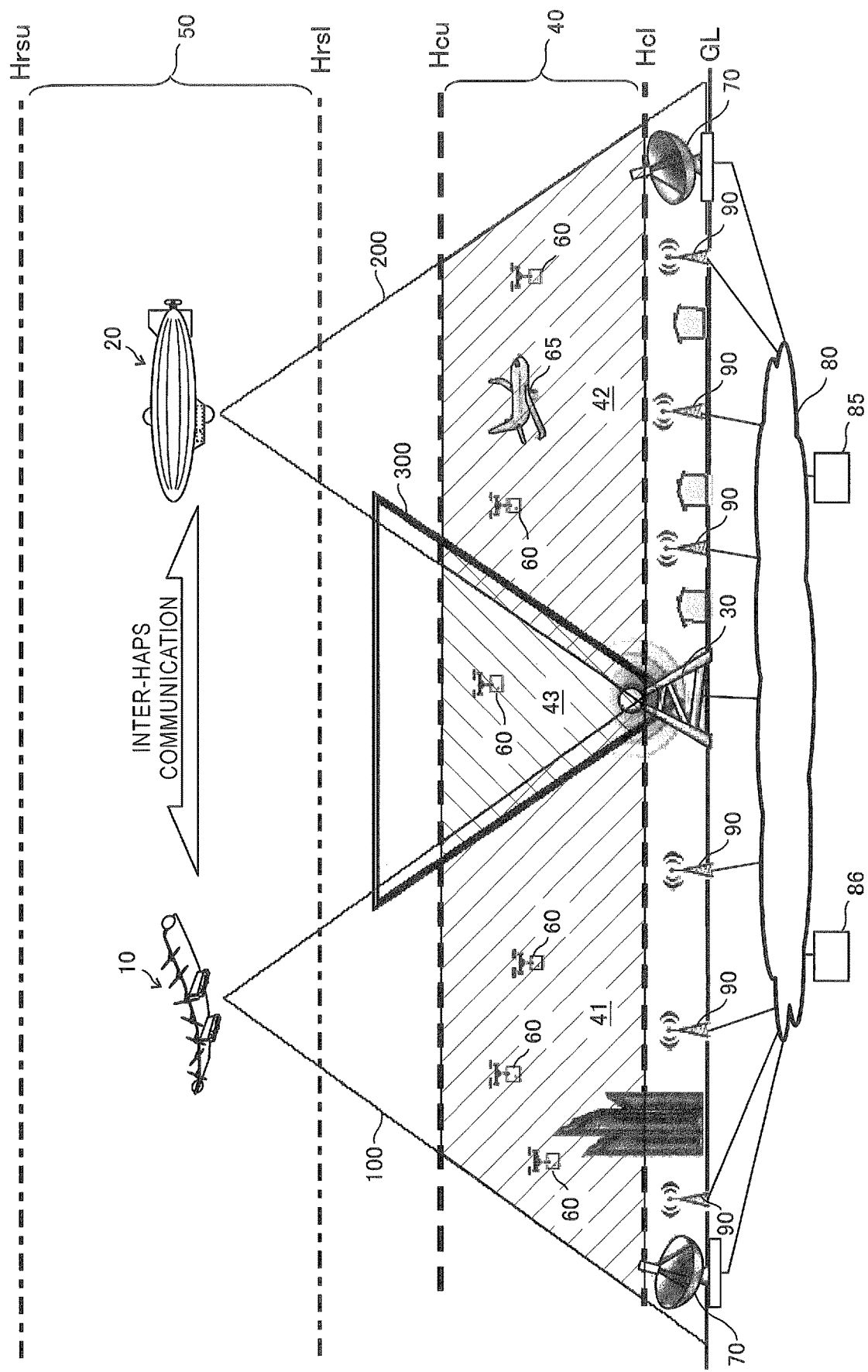
FIG. 1 is a schematic configuration diagram showing an example of an overall configuration of a communication system for realizing a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network of the fifth generation mobile communication corresponding to a simultaneous connection to a large number of terminal apparatuses, a low delay method, etc. Further, the mobile communication standard applicable to a communication system, a radio relay station, a base station, a repeater, and a terminal apparatus disclosed in the present description, includes a fifth generation mobile communication standard and next generation mobile communication standards after the fifth generation.

As shown in FIG. 1, a communication system is provided with a plurality of High Altitude Platform Stations (HAPS) (also referred to as "High Altitude Pseudo Satellite") 10 and 20 as a plurality of communication relay apparatuses (radio relay apparatuses) of an aerial floatage type. The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. Each of the HAPSs 10 and 20 is a floating object (for example, solar plane, airship) including a radio relay station mounted therein, which is controlled to be floated or flied and located in an airspace (floating airspace) 50 with high altitude of 100 [km] or less from the ground level or the sea level by an autonomous control or an external control.

The airspace 50 in which the HAPSs 10 and 20 are located is, for example, a stratospheric airspace with an altitude of 11 [km] or more and 50 [km] or less. The airspace 50 may be an airspace in an altitude of 15 [km] or more and 25 [km] or less where the weather conditions are relatively stable, and may be an airspace with an altitude of approximately 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station (for example, LTE eNodeB) 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

The radio relay stations of the HAPSs 10 and 20 respectively forms beams 100 and 200 for a radio communication with the terminal apparatus that is a mobile station, toward the ground level. The terminal apparatus may be a communication terminal module installed in a drone 60 that is an aircraft such as a small helicopter capable of remotely steering, or may be a user apparatus used by a user in the airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the radio relay stations of the HAPSs 10 and 20 is, for example, a base station for performing a radio communication with a feeder station (gateway) 70 as a relay station connected to a core network on the ground (or on the sea), or a slave repeater for performing a radio communication with a feeder station (master repeater) 70 connected to a base station on the ground (or on the sea). Each of the radio relay stations of the HAPSs 10 and 20 is connected to the core network of the mobile communication network 80 via the feeder station 70 installed on the ground or on the sea. The communication between the HAPSs 10 and 20 and the feeder station 70 may be performed by a radio communication using radio waves such as microwaves, or may be performed by an optical communication using laser light or the like.

Each of the HAPSs 10 and 20 may autonomously control its own floating movement (flight) or a processing at the radio relay station, by executing a control program with a control section including a computer or the like incorporated in the inside of the HAPS. For example, each of the HAPSs 10 and 20 may acquire its own current position information (for example, GPS position information), position control information (for example, flight schedule information) stored in advance, and position information on another HAPS located in a peripheral space, etc., and autonomously control the floating movement (flight) and the processing in the radio relay station based on these kinds of information.

The floating movement (flight) of each HAPS 10 and 20 and the processing in the radio relay stations may be controlled by a remote control apparatus 85 as a management apparatus, which is disposed in a communication center or the like of the mobile communication network 80. In this case, the HAPSs 10 and 20 may include a communication terminal apparatus for control (for example, a mobile communication module) so that control information from the remote control apparatus 85 can be received and various information can be transmitted to the remote control apparatus 85, and terminal identification information (for example, IP address, telephone number, etc.) may be allocated to the communication terminal apparatus so as to be identified from the remote control apparatus 85. The MAC address of the communication interface may be used for identifying the communication terminal apparatus for control. Each of the HAPSs 10 and 20 may transmit information relating to the floating movement (flight) of the HAPS itself or the surrounding HAPS and the processing at the radio relay station and information such as observation data acquired by various sensors to a predetermined destination such as the remote control apparatus 85.

In the cell-formation target airspace 40, there is a possibility that a spatial area where the beams 100 and 200 of the HAPSs 10 and 20 do not pass may occur, in which the three-dimensional cells 41 and 42 are not formed. In order to spatially complement this area, as shown in the configuration example in FIG. 1, a base station (hereinafter referred to as "ATG station") 30 may be disposed, which forms a three-dimensional cell 43 by forming a radial beam 300 from the ground or the sea side upward to make an ATG (Air To Ground) connection.

By adjusting the positions of the HAPSs 10 and 20 and the divergence angle (beam width) etc. of the beams 100 and 200 without using the ATG station 30, the radio relay stations of the HAPSs 10 and 20 may form the beams 100 and 200 covering the overall upper end face of the cell-formation target airspace 40 so that three-dimensional cells are formed all over the cell-formation target airspace 40.

It is noted that, the three-dimensional cell formed by the HAPSs 10 and 20 may be formed so as to reach the ground level or the sea level so as to be able to communicate also with the terminal apparatus located on the ground or on the sea.

Figure 2:
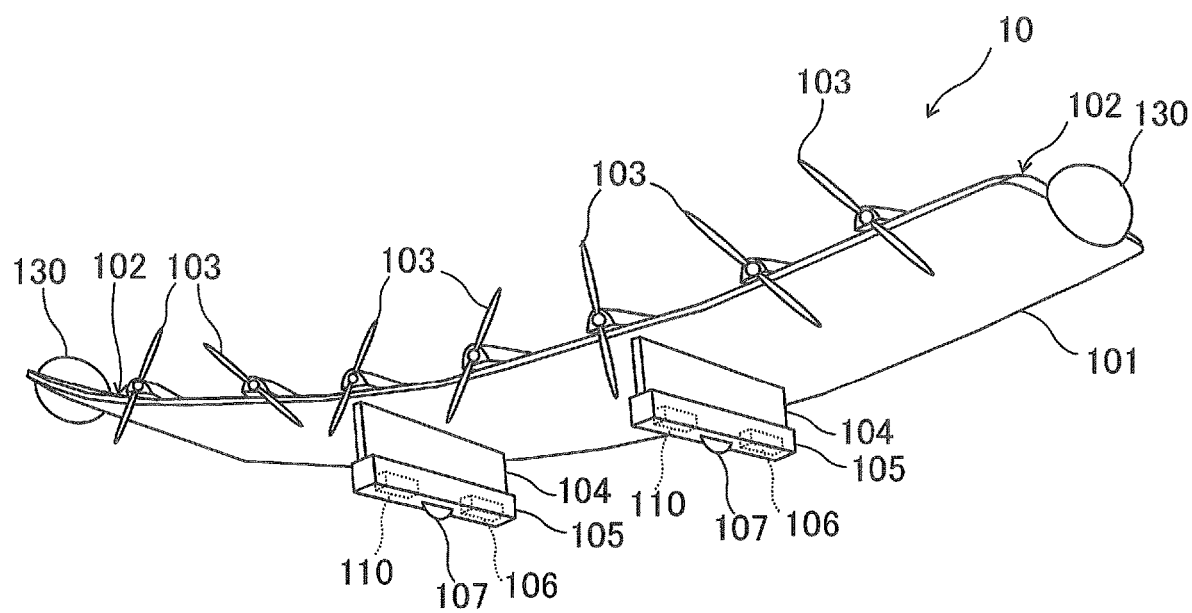
FIG. 2 is a perspective view showing an example of HAPS used in a communication system according to the embodiment.

FIG. 2 is a perspective view showing an example of the HAPS 10 used in the communication system in the embodiment.

The HAPS 10 in FIG. 2 is a solar plane-type HAPS, and has a main wing section 101 in which both end portions in the longitudinal direction are warped upward, and a plurality of motor-driven propellers 103 as a propulsion apparatus of a bus-motive power system provided at one end edge portion of the main wing section 101 in the lateral direction. A solar-power generation panel (hereinafter referred to as "solar panel") 102 as a solar-power generation section having a solar-power generation function is provided on the upper surface of the main wing section 101. Pods 105 as a plurality of apparatus accommodating sections for accommodating the mission equipment are connected to the two positions in the longitudinal direction of the lower surface of the main wing section 101 via a plate-like connecting section 104. Inside each pod 105, a radio relay station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay processing by the radio relay station 110 is executed. It is noted that, in the example of FIG. 2, although an example in which the plurality of radio relay stations 110 are provided is shown, the radio relay station 110 may be provided in any one of the plurality of pods 105.

The solar plane-type HAPS 10 can float with lift force by, for example, performing a turning flight or performing a flight along a figure of "8", and can float to stay in a predetermined range in the horizontal direction at a predetermined altitude. It is noted that, the solar plane-type HAPS 10 can also fly like a glider when the propeller 103 is not rotationally driven. For example, when electric power of the battery 106 is surplus by power generation of the solar panel 102, such as in daytime, the solar plane-type HAPS 10 rises up to a high position, and when an electric power cannot be generated by the solar panel 102 such as at night, the solar plane-type HAPS 10 can stop power supply from the battery 106 to the motor and fly like a glider.

The HAPS 10 has an optical antenna apparatus 130 of the directivity for three dimensions as a communication section used for an optical communication with another HAPS and an artificial satellite. In the example of FIG. 2, although the optical antenna apparatus 130 is disposed at both ends of the main wing section 101 in the longitudinal direction, the optical antenna apparatus 130 may be disposed at another location of the HAPS 10. It is noted that the communication section used for optical communications with other HAPS and artificial satellites is not limited to such optical communication, and may be radio communications by other methods such as a radio communication using radio waves such as microwaves.

Figure 3:
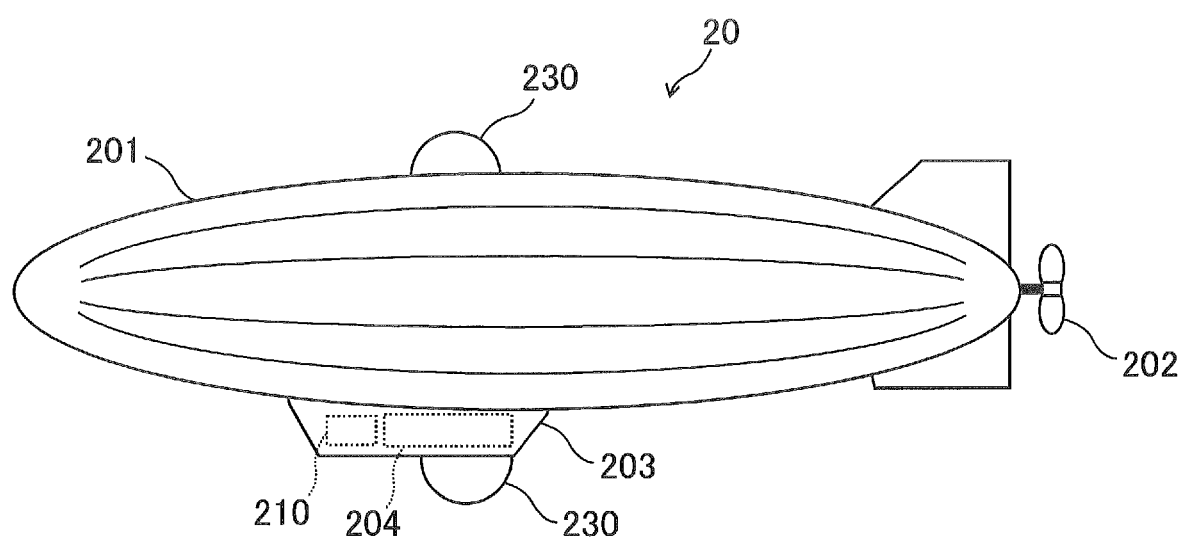
FIG. 3 is a side view showing another example of HAPS used in a communication system according to the embodiment.

FIG. 3 is a perspective view showing another example of the HAPS 20 used in the communication system in the embodiment.

The HAPS 20 in FIG. 3 is an unmanned airship-type HAPS, and can mount a large capacity battery since the payload is large. The HAPS 20 has an airship body 201 filled with gas such as helium gas for floating by floating power, a propeller 202 driven by a motor as a propulsion apparatus of a bus-motive power system, and an equipment accommodating section 203 in which mission equipment is accommodated. A radio relay station 210 and a battery 204 are accommodated in the equipment accommodating section 203. A motor of the propeller 202 is rotationally driven by an electric power supplied from the battery 204, and a radio relay processing by the radio relay station 210 is executed.

It is noted that, a solar panel having a photovoltaic power generation function may be provided on the top surface of the airship body 201, and an electric power generated by the solar panel may be stored in the battery 204.

The unmanned airship-type HAPS 20 also includes an optical antenna apparatus 230 of the three-dimensional directivity as a communication section used for an optical communication with other HAPS and artificial satellites. In the example of FIG. 3, although the optical antenna apparatus 230 is disposed on an upper surface section of the airship object 201 and a lower surface section of the equipment accommodating section 203, the optical antenna apparatus 230 may be disposed on another section of the HAPS 20. Note that the communication section used for the optical communication with other HAPS and artificial satellites is not limited to the one that performs such optical communication, but may be one that performs a radio communication by another method such as a radio communication using radio waves such as microwaves.

Figure 4:
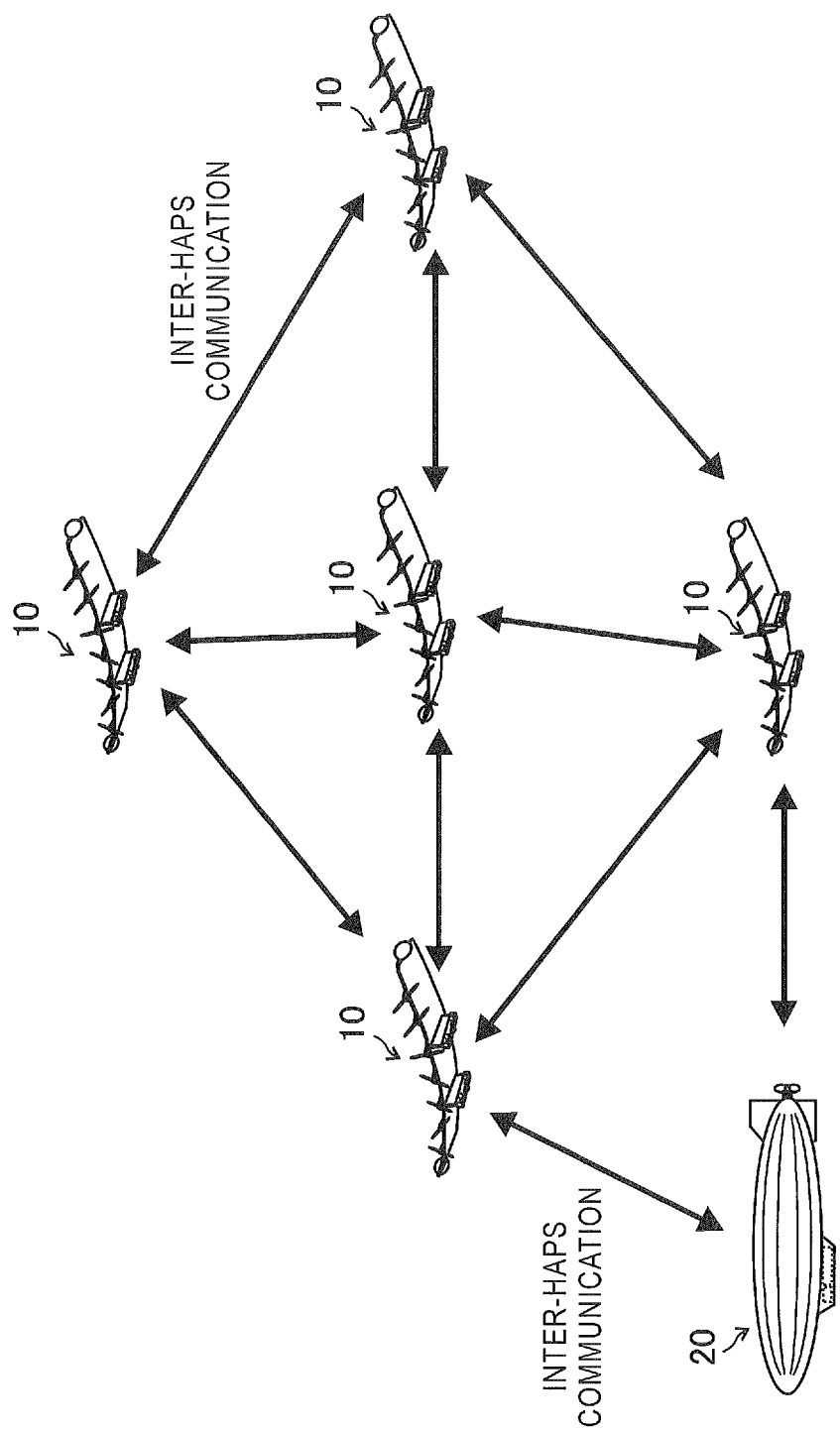
FIG. 4 is an explanatory diagram showing an example of a radio network formed in an upper airspace with a plurality of HAPSs according to the embodiment.

FIG. 4 is an explanatory diagram showing an example of a radio network formed in an upper airspace with the plurality of HAPSs 10 and 20 in the embodiment.

The plurality of HAPSs 10 and 20 are configured to be able to perform an inter-HAPS communication by the optical communication with each other in an upper airspace, and form a radio communication network with excellent robustness capable of stably realizing a three-dimensional network over a wide area. This radio communication network can also function as an ad-hoc network by a dynamic routing according to various environments and various information. The radio communication network can be formed to have various two-dimensional or three-dimensional topologies, and may be, for example, a mesh-type radio communication network as shown in FIG. 4.

Figure 5:
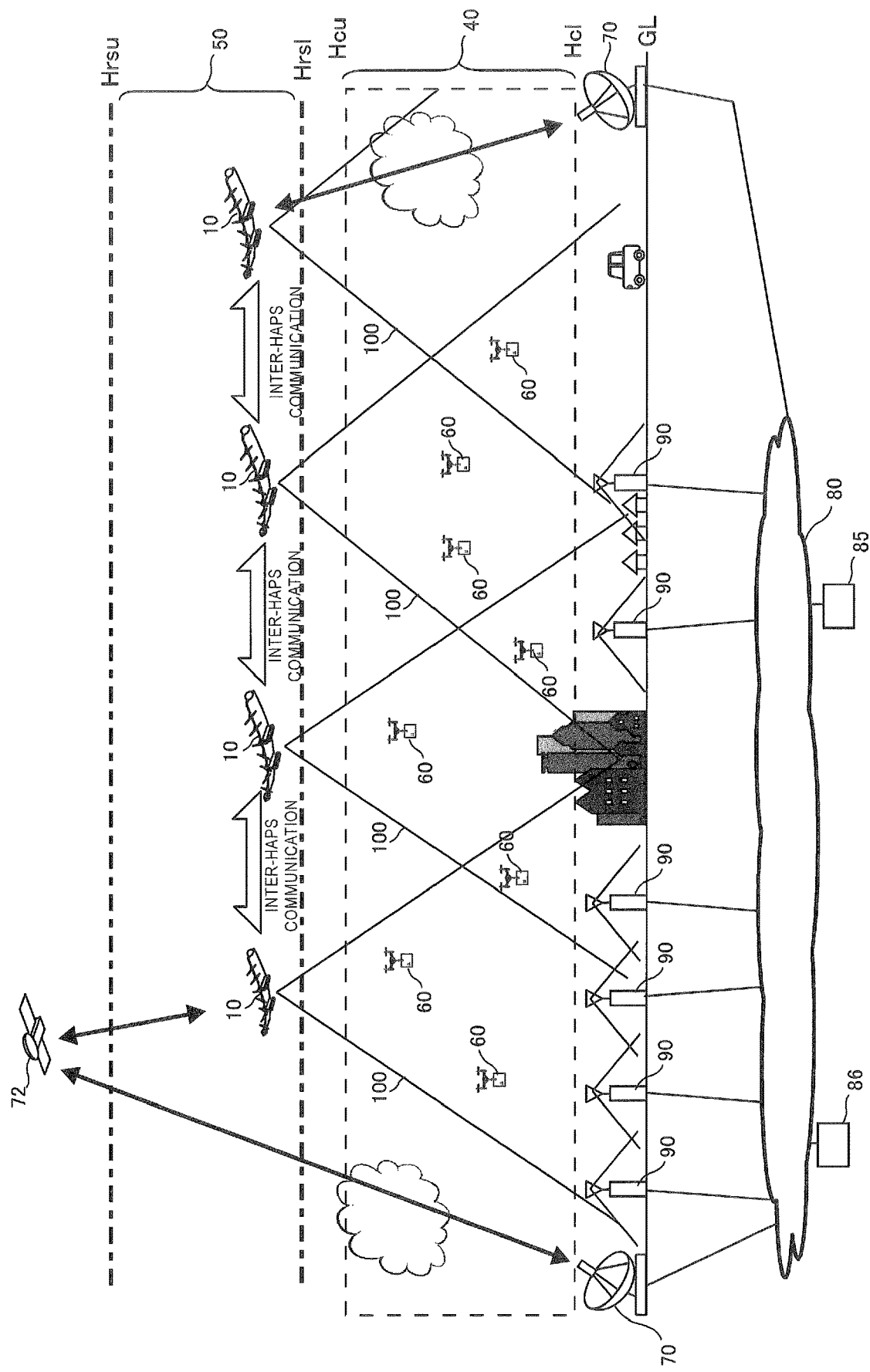
FIG. 5 is a schematic configuration diagram showing an example of an overall configuration of a communication system for realizing a three-dimensional network according to still another embodiment.

FIG. 5 is a schematic configuration diagram showing an example of an overall configuration of a communication system according to another embodiment.

It is noted that, in FIG. 5, configuration elements similar to those in FIG. 1 are denoted by the same reference numerals and explanation thereof will be omitted.

In the embodiment of FIG. 5, a communication between the HAPS 10 and the core network of the mobile communication network 80 is performed via the feeder station 70 and a low-orbit artificial satellite 72. In this case, a communication between the artificial satellite 72 and the feeder station 70 may be performed by a radio communication using radio waves such as microwaves, or may be performed by an optical communication using laser light or the like. A communication between the HAPS 10 and the artificial satellite 72 is performed by the optical communication using laser light or the like.

Figure 6:
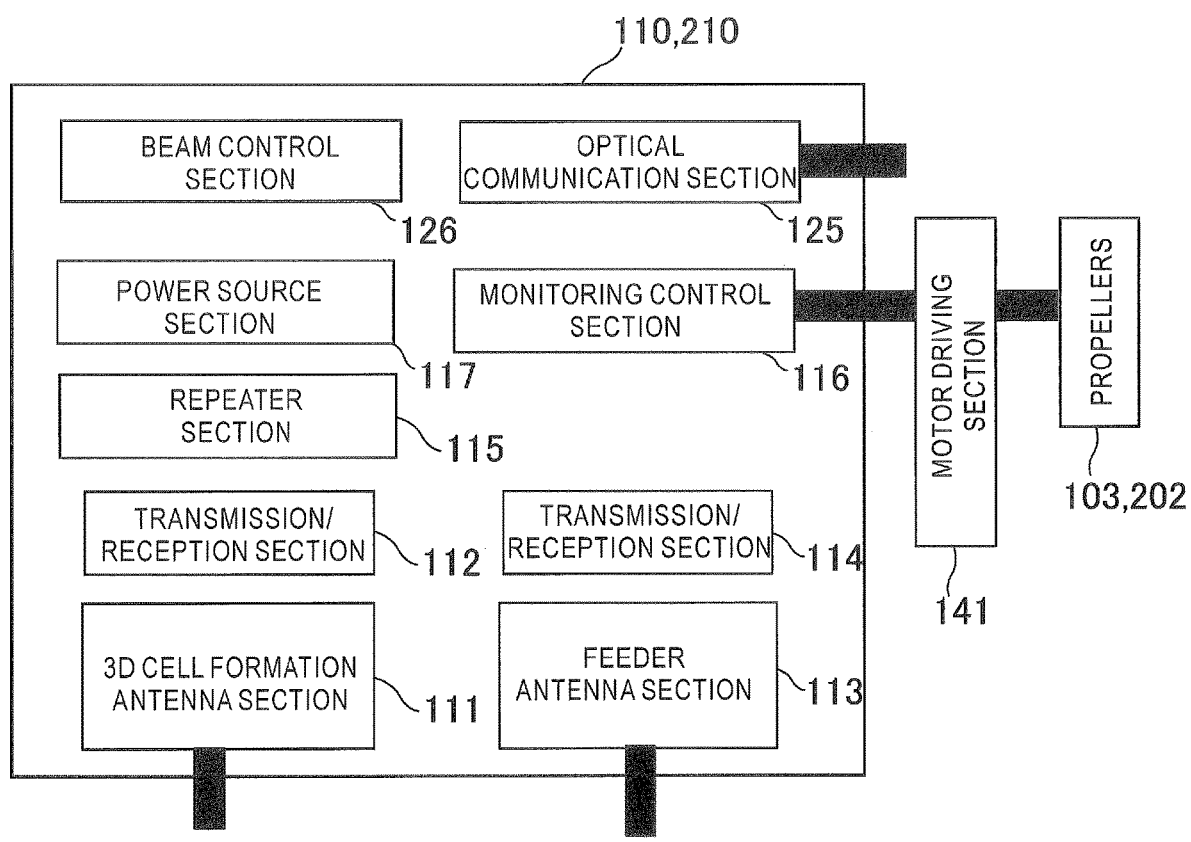
FIG. 6 is a block diagram showing a configuration example of a radio relay station of HAPS in the embodiment.

FIG. 6 is a block diagram showing a configuration example of radio relay stations 110 and 210 of the HAPSs 10 and 20 in the embodiment.

The radio relay stations 110 and 210 in FIG. 5 are examples of a repeater-type radio relay station. Each of the radio relay stations 110 and 210 includes a 3D cell-formation antenna section 111, a transmission/reception section 112, a feeder antenna section 113, a transmission/reception section 114, a repeater section 115, a monitoring control section 116 and a power source section 117. Furthermore, each of the radio relay stations 110 and 210 includes an optical communication section 125 used for the inter-HAPS communication and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section with 3D cell-formation antenna section 111, has a transmission/reception duplexer (DUP: DUPlexer) and an amplifier, etc., and transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes a second radio communication section with the feeder antenna section 113, has a transmission/reception duplexer (DUP: DUPlexer) and an amplifier, etc., and transmits radio signals to the feeder station 70 and receives radio signals from the feeder station 70 via the feeder antenna section 113.

The repeater section 115 relays signals of the transmission/reception section 112 which is transmitted to and received from the terminal apparatus and signals of the transmission/reception section 114 which is transmitted to and received from the feeder station 70. The repeater section 115 has an amplifier function that amplifies a relay target signal of a predetermined frequency to a predetermined level. The repeater section 115 may have a frequency conversion function for converting the frequency of the relay target signal.

The monitoring control section 116 is composed of, for example, a CPU and a memory, etc., and monitors the operation processing status of each section and controls each section in the HAPSs 10 and 20, by executing a preinstalled program. In particular, the monitoring control section 116 controls a motor driving section 141 that drives the propellers 103 and 202 to move the HAPSs 10 and 20 to a target position, and also controls to stay in the vicinity of the target position, by executing a control program.

The power source section 117 supplies an electric power outputted from the batteries 106 and 204 to each section in the HAPSs 10 and 20. The power source section 117 may have a function of storing an electric power generated by the solar power generation panel, etc. and an electric power supplied from outside in the batteries 106 and 204.

The optical communication section 125 communicates with neighboring other HAPSs 10 and 20 and the artificial satellite 72 via an optical communication medium such as laser light. By the communication, a dynamic routing that dynamically relays radio communication between a terminal apparatus such as the drone 60 and the mobile communication network 80 becomes possible, and a robustness of the mobile communication system can be improved by other HAPS backing it up and relaying wirelessly when either HAPS broke down.

The beam control section 126 controls a direction and intensity of a beam of laser light or the like used for the inter-HAPS communication or the communication with the artificial satellite 72, and performs control so as to switch another HAPS (radio relay station) that performs communication using a light beam such as a laser light in accordance with a change in relative position with neighboring another HAPS (radio relay station). This control may be performed based on, for example, a position and attitude of the HAPS itself, positions of neighboring HAPS, and the like. Information on the position and attitude of the HAPS itself may be acquired based on an output of a GPS receiver, a gyro sensor, an acceleration sensor or the like installed in the HAPS, and information on the position of the neighboring HAPS may be acquired from the remote control apparatus 85 provided in the mobile communication network 80, or a server 86 such as a HAPS management server or an application server.

Figure 7:
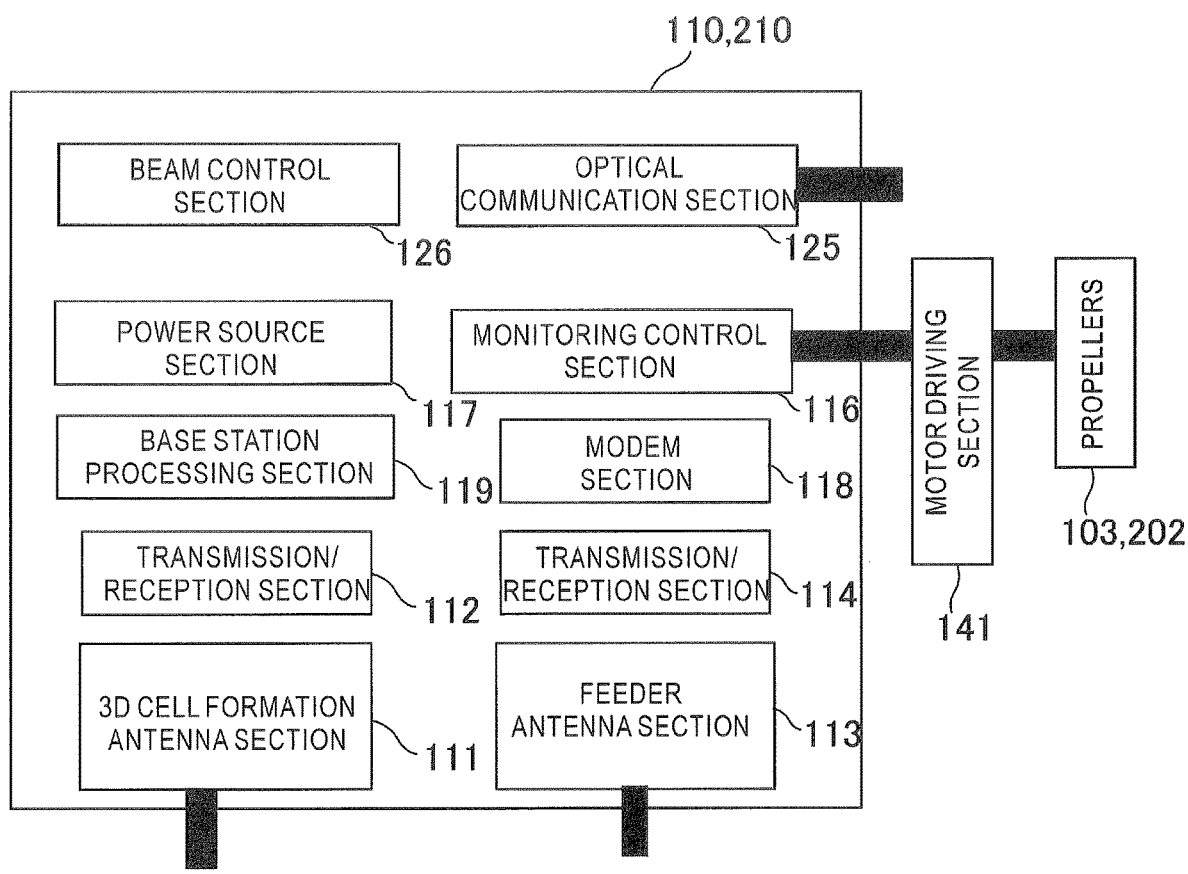
FIG. 7 is a block diagram showing another configuration example of a radio relay station of HAPS in the embodiment.

FIG. 7 is a block diagram showing another configuration example of the radio relay stations 110 and 210 of the HAPSs 10 and 20 in the embodiment.

The radio relay stations 110 and 210 in FIG. 7 are examples of base-station type radio relay station.

It is noted that, in FIG. 7, configuration elements similar to those in FIG. 6 are denoted by the same reference numerals and explanation thereof will be omitted. Each of the radio relay stations 110 and 210 in FIG. 7 further includes a modem section 118 and a base-station processing section 119 instead of the repeater section 115. Further, each of the radio relay stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119. The modem section 118 performs an encoding processing and a modulation processing for the data signal received from the base-station processing section 119, and generates a transmission signal to be transmitted to the feeder station 70 via the feeder antenna section 113 and the transmission/reception section 114.

The base-station processing section 119, for example, has a function as an e-Node B that performs a baseband processing based on a method conforming to the standard of LTE/LTE-Advanced. The base-station processing section 119 may process in a method conforming to a future standard of mobile communication such as the fifth generation.

The base-station processing section 119, for example, performs a demodulation processing and a decoding processing for a reception signal received from a terminal apparatus located in the three-dimensional cells 41 and 42 via the 3D cell-formation antenna section 111 and the transmission/reception section 112, and generates a data signal to be outputted to the modem section 118. The base-station processing section 119 performs an encoding processing and a modulation processing for the data signal received from the modem section 118, and generates a transmission signal to be transmitted to the terminal apparatus of the three-dimensional cells 41 and 42 via the 3D cell-formation antenna section 111 and the transmission/reception section 112.

Figure 8:
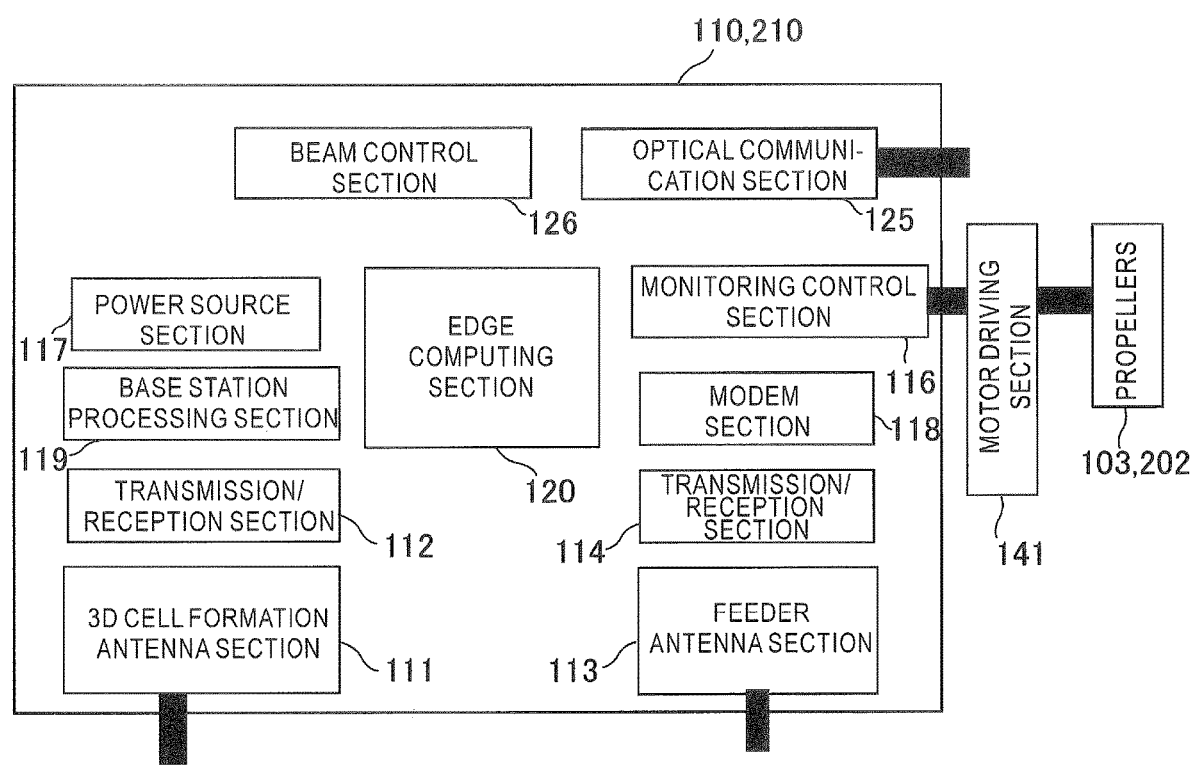
FIG. 8 is a block diagram showing still another configuration example of a radio relay station of HAPS in the embodiment.

FIG. 8 is a block diagram showing still another configuration example of radio relay stations 110 and 210 of the HAPSs 10 and 20 in the embodiment.

The radio relay stations 110 and 210 in FIG. 8 are examples of a high performance base-station type radio relay station having an edge computing function. It is noted that, in FIG. 8, configuration elements similar to those in FIG. 6 and FIG. 7 are denoted by the same reference numerals and explanation thereof will be omitted. Each of the radio relay stations 110 and 210 in FIG. 8 further includes an edge computing section 120 in addition to the configuration elements of FIG. 7.

The edge computing section 120 is configured with, for example, a compact computer, and can perform various types of information processing relating to a radio relay, etc., in the radio relay stations 110 and 210 of the HAPSs 10 and 20, by executing a preinstalled program.

The edge computing section 120, for example, determines a transmission destination of a data signal based on the data signal received from a terminal apparatus located in the three-dimensional cells 41 and 42, and performs a process of switching a relay destination of communication based on the determination result. More specifically, in case that the transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119 and transmits the data signal to the terminal apparatus of the transmission destination located in the own three-dimensional cells 41 and 42. On the other hand, in case that the transmission destination of the data signal outputted from the base-station processing section 119 is a terminal apparatus located in another cell other than the own three-dimensional cells 41 and 42, the edge computing section 120 passes the data signal to the modem section 118 and transmits the data signal to the feeder station 70, and transmits the data signal to the terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to the large number of terminal apparatuses located in the three-dimensional cells 41 and 42, and may be transmitted to the remote control apparatus 85 provided in the mobile communication network 80 or the server 86 such as a HAPS management server or an application server (application server).

Uplink and downlink duplex methods for radio communication with a terminal apparatus via the radio relay stations 110 and 210 are not limited to a specific method, and may be, for example, a time division duplex method (Time Division Duplex: TDD) or a frequency division duplex method (Frequency Division Duplex: FDD). An access method for radio communication with a terminal apparatus via the radio relay stations 110 and 210 is not limited to a specific method, and may be, for example, FDMA (Frequency Division Multiple Access) method, TDMA (Time Division Multiple Access) method, CDMA (Code Division Multiple Access) method or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different communication terminal apparatuses at the same time/same frequency or a plurality of different base stations transmit signals to one terminal apparatus at the same time/same frequency.

Hereinafter, although a case where a radio relay apparatus for performing a radio communication with a terminal apparatus is the solar plane-type HAPS 10 will be described, the following embodiments can be similarly applied to another radio relay apparatus such as the unmanned airship-type HAPS 20. In addition, some embodiments can be similarly applied to a fixed-type radio relay apparatus (for example, a base station or a slave repeater) in which a radio relay apparatus for performing a radio communication with a terminal apparatus is installed on the ground or on the sea.

Figure 9:
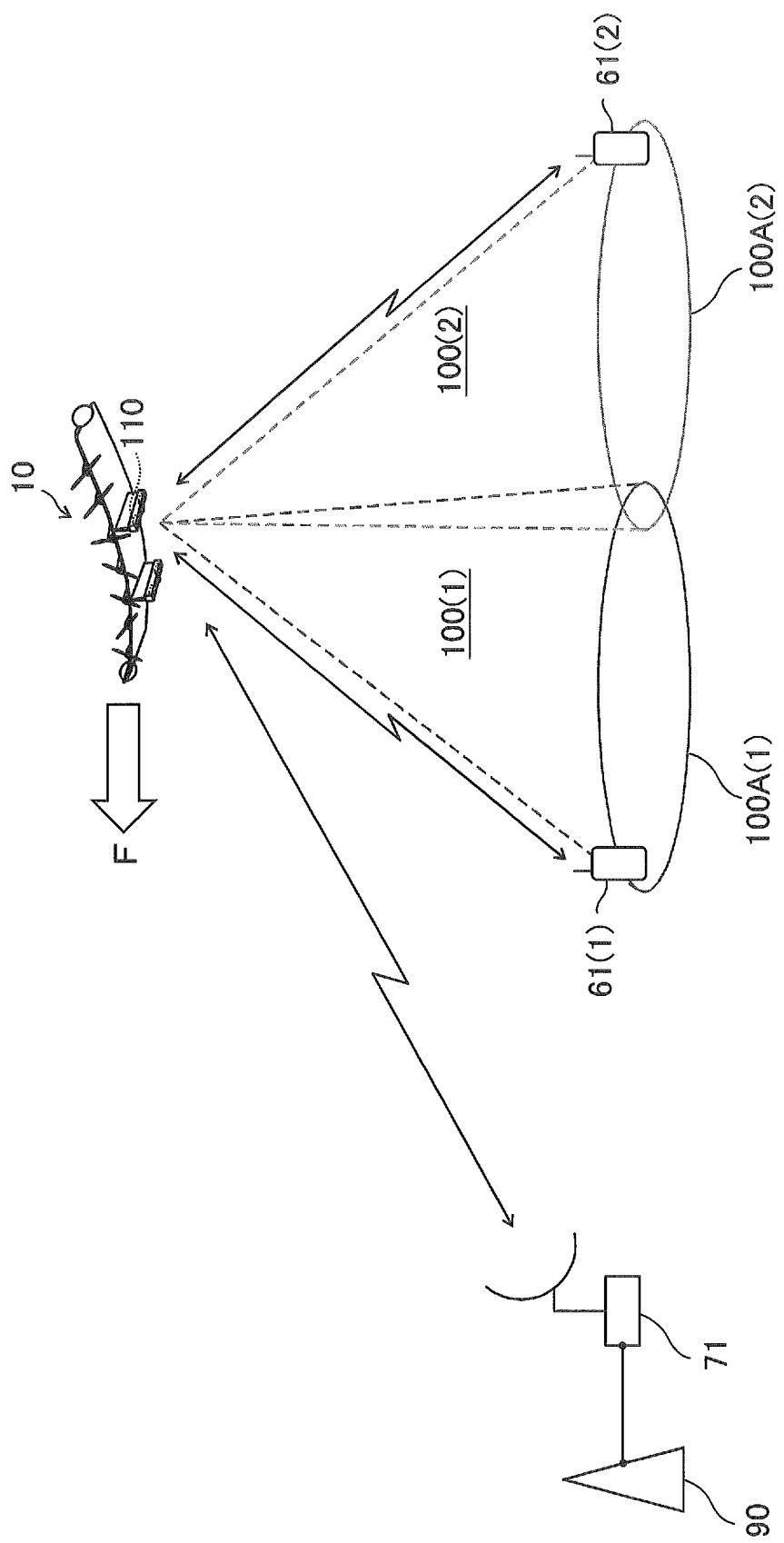
FIG. 9 is an explanatory diagram showing an example of a positional relationship between HAPS in flight and terminal apparatuses of a plurality of cells formed by the HAPS.
Figure 10A:
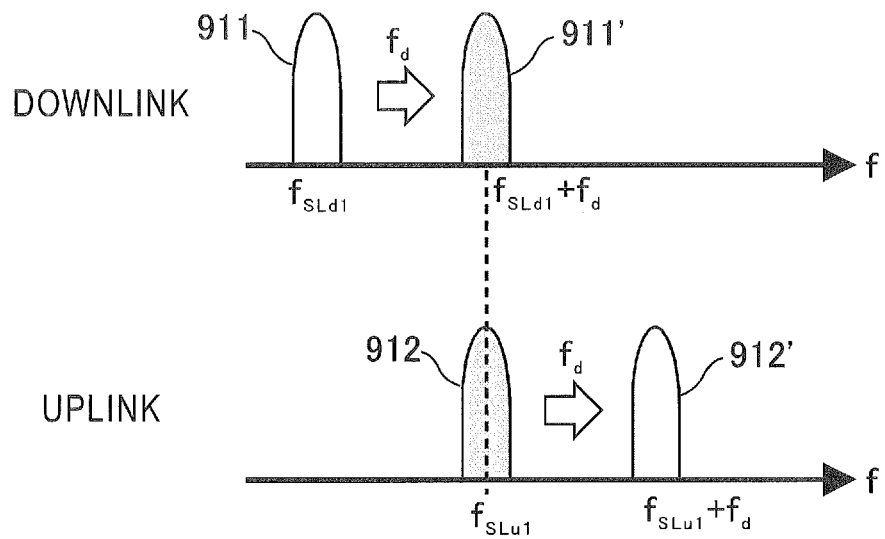
FIG. 10A is an explanatory diagram showing an example of a Doppler shift in a radio communication between a radio relay station of HAPS in flight and a terminal apparatus.
Figure 10B:
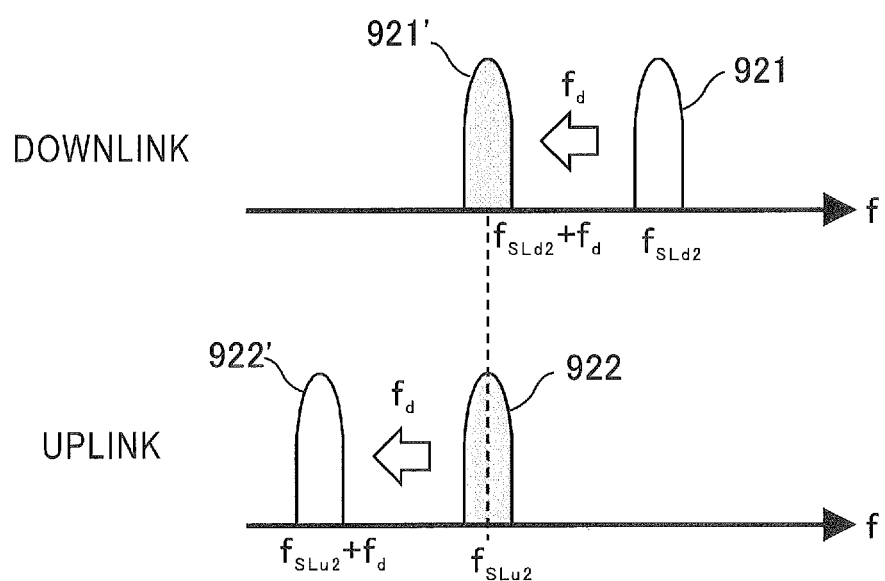
FIG. 10B is an explanatory diagram showing an example of a Doppler shift in a radio communication between a radio relay station of HAPS in flight and a terminal apparatus.
Figure 11:
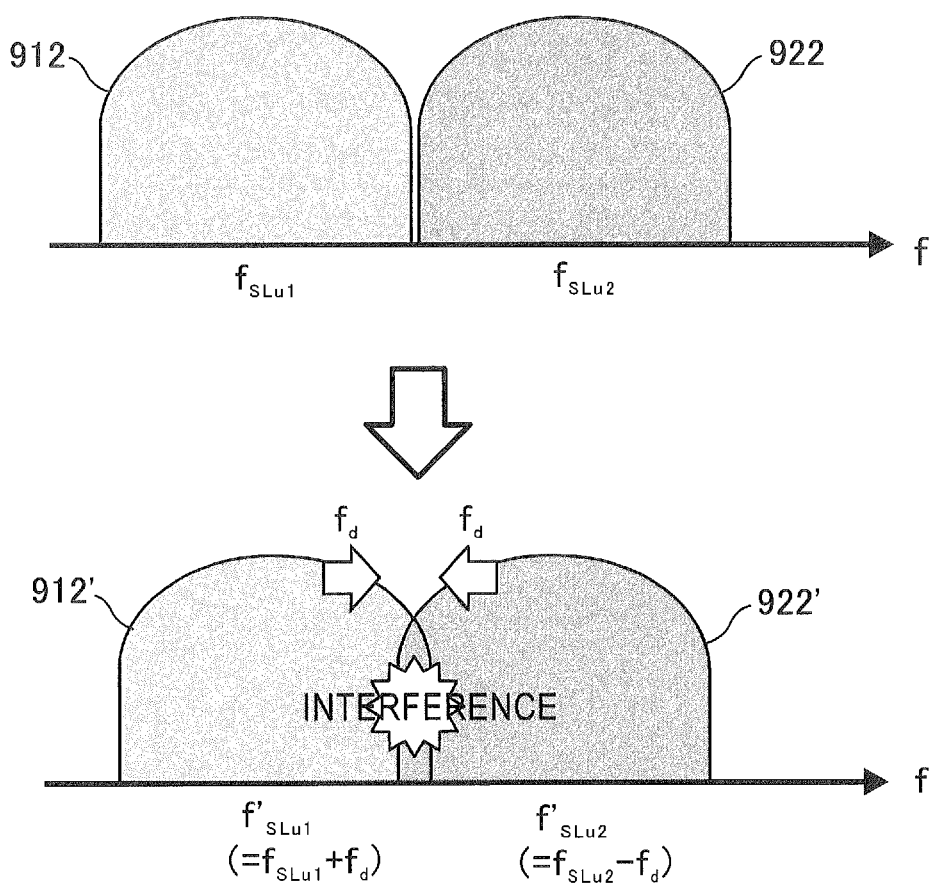
FIG. 11 is an explanatory diagram showing an example of an interference of reception signals due to Doppler shift in an uplink radio communication between a radio relay station of HAPS in flight and a terminal apparatus.

FIG. 9 is an explanatory diagram showing an example of a positional relationship between the HAPS 10 in flight and terminal apparatuses 61(1) and 61(2) of a plurality of cells 100A(1) and 100A(2) formed by the HAPS 10. FIG. 10A and FIG. 10B are explanatory diagrams showing an example of a Doppler shift in a radio communication between a radio relay station of the HAPS 10 in flight and the terminal apparatuses 61(1) and 61(2). Further, FIG. 11 is an explanatory diagram showing an example of an interference of reception signals due to a Doppler shift in a radio communication of uplink of service link (also referred to as "reverse link") between the radio relay station of the HAPS 10 in flight and the terminal apparatuses.

The HAPS 10 in FIG. 9 is flying in a left direction F in the figure while forming two-dimensional cells 100A(1) and 100A(2) on the ground with a plurality of beams 100(1) and 100(2). A three-dimensional cell is formed by a space surrounded by the beams 100(1) and 100(2) and the cells 100A(1) and 100A(2). The terminal apparatuses 61(1) and 61(2) located in each of the cells 100A(1) and 100A(2) can communicate with the base station 90 via the service link, the HAPS 10, the feeder link and a master repeater (feeder station) 71. Further, the radio relay station 110 of the HAPS 10 flying in a flight direction F approaches the terminal apparatus 61(1) in the cell 100A(1) located on the downstream side in the flight direction F, and moves away from the terminal apparatus 61(2) in the cell 100A(2) located on the upstream side in the flight direction F.

As shown in FIG. 10(a), in a radio communication of downlink (also referred to as "forward link") of service link for transmitting a transmission signal 911 having a frequency $f_{SLd1}$ from the radio relay station 110 of the HAPS 10 to the downstream terminal apparatus 61(1), by Doppler phenomenon, a frequency of a reception signal 911' received by the terminal apparatus 61(1) is shifted to high frequency side by a Doppler shift $f_d$ to become a frequency $f'_{SLd1}$ (=$f_{SLd1}+f_d$). On the other hand, in uplink from the downstream terminal apparatus 61(1), a transmission signal 912 having a frequency $f'_{SLu1}(=f_{SLd1}+f_d)$ is transmitted with reference to the frequency $f'_{SLd1}(=f_{SLd1}+f_d)$ of the downlink reception signal 911'. Then, due to the Doppler phenomenon, a frequency of a reception signal 912' received by the radio relay station 110 of the HAPS 10 is shifted to high frequency side by the Doppler shift $f_d$ to become a frequency $f''_{SLu1}(=f'_{SLu1}+f_d)$. As a result, a frequency shift close to twice that of the downlink may occur at a receiving side of service link.

Further, as shown in FIG. 10(b), in a downlink radio communication of service link for transmitting a transmission signal 921 of a frequency $f_{SLd2}$ from the radio relay station 110 of the HAPS 10 to the upstream terminal apparatus 61(2), due to the Doppler phenomenon, a frequency of a reception signal 921' received by the terminal apparatus 61(1) is shifted to low frequency side by the Doppler shift $f_d$ to become a frequency $f'_{SLd2}(=f_{SLd2}-f_d)$. On the other hand, in uplink from the upstream side terminal apparatus 61(2), a transmission signal 922 having a frequency $f'_{SLu2}(=f_{SLd2}-f_d)$ is transmitted with reference to the frequency $f'_{SLd2}(=f_{SLd2}-f_d)$ of a downlink receiving signal 921'. Then, due to the Doppler phenomenon, a frequency of a reception signal 922' received by the radio relay station 110 of the HAPS 10 is shifted to high frequency side by the Doppler shift $f_d$ to become a frequency $f''_{SLu2}(=f'_{SLu2}-f_d)$. As a result, a frequency shift close to twice that of the downlink may occur at a receiving side of the service link.

Thus, by the Doppler shifts of the reception signals due to relative movement of the HAPS 10 with respect to the terminal apparatuses 61(1) and 61(2) located in the plurality of cells 100A(1) and 100A(2) respectively, there is a possibility that communication quality may be deteriorated in the radio communication between the radio relay station 110 of the HAPS 10 and the terminal apparatuses 61(1) and 61(2).

In particular, in the example of FIG. 9, the cell 100A(1) where the terminal apparatus 61(1) to which the HAPS 10 in flight approaches is located, and the cell 100A(2) where the terminal apparatus 61(2) from which the HAPS 10 moves away is located, are mixed. As described above, when a plurality of cells, in which the directions and velocities of relative movement of the terminal apparatus 61 with respect to the HAPS 10 are different form each other, are mixed, the relative movement velocity of the HAPS 10 with respect to the terminal apparatus 61 may increase depending on the cell. Further, when the HAPS 10 is flying at a high velocity, the relative movement velocity of the HAPS 10 with respect to the terminal apparatus 61 is increased. Generally, in a mobile station as a terminal apparatus of a mobile communication system, there is a correction mechanism that corrects a Doppler shift as a reference for a new frequency based on the frequency shifted by a Doppler phenomenon by using a reference signal, etc. from the base station. However, when the relative velocity of the HAPS 10 with respect to the terminal apparatus 61 is large and the Doppler shift (frequency shift) is too large, and when using a high frequency exceeding several tens of GHz in the radio communication of the service link between the terminal apparatus 61 and the radio relay station 110 of the HAPS 10 and the radio communication of the feeder link between the radio relay station 110 of the HAPS 10 and the master repeater (feeder station) 71, the terminal apparatus 61 cannot completely correct the Doppler shift. That is, the Doppler shift of frequency of the reception signal generated by the Doppler phenomenon becomes larger than the correctable range, and the communication quality is deteriorated. In addition, although the downlink Doppler shift can be overcome by the correction mechanism in the terminal apparatus, as described above, since the transmission is performed with reference to the downlink frequency in the uplink, a frequency shift close to twice that of the downlink may occur at a receiving side of the service link.

In addition, as shown in FIG. 11, in the uplink where the radio relay station 110 of the HAPS 10 for forming the plurality of cells 100A(1) and 100A(2) receives the signals 912 and 922 from the plurality of terminal apparatuses 61(1) and 61(2), it is conceivable to perform a scheduling in a coordinated manner so that resource allocation areas (frequency: $f_{SLu1}$, $f_{SLu2}$) do not overlap between the cells. However, even if such coordinated scheduling between cells is performed, due to the frequency offset of the reception signals 912' and 922' generated by the Doppler shift $f_d$, the resources that are completely orthogonal between cells lose orthogonality, and an interference between terminal apparatuses (between users) occurs. In the terminal apparatuses (users) 61(1) and 61(2) at both ends of the cells 100A(1) and 100A(2) formed by the HAPS 10, since the frequency shift amount becomes opposite to each other, a carrier interference between terminal apparatuses (between users) is particularly likely to occur. Once the interference occurs, it is difficult to separate the interference, so it is difficult to perform a correction with the frequency offset.

Therefore, in each embodiment shown below, by estimating a Doppler shift for each of the cells formed by the HAPS 10, for each terminal apparatus or for each terminal group in the cell, and correcting the frequency of radio communication between the terminal apparatus and the HAPS based on the estimation result, the deterioration in communication quality caused by the Doppler shift of the reception signal due to the relative movement of HAPS with respect to the terminal apparatuses of each of the plurality of cells is suppressed. Hereinafter, in the embodiment, a control for estimating the Doppler shift and correcting the frequency of radio communication between the terminal apparatus and the HAPS so as to suppress the deterioration of communication quality caused by the Doppler shift based on the estimation result is also referred to as "Doppler-shift correction control".

In one embodiment, for each of the plurality of cells (three-dimensional cells) 100A formed by the HAPS 10, the Doppler shift in the radio communication between the terminal apparatus 61 located in the cell due to the movement of the HAPS 10 and the HAPS 10 is estimated, and for each of the plurality of cells 100A, based on the Doppler shift estimation result, the frequency of the service-link radio communication between the terminal apparatus 61 located in the plurality of cells 100A and the HAPS 10 is corrected. For example, the direction and magnitude of the Doppler shift are estimated for each cell 100A according to the moving direction of the HAPS 10 equipped with the slave repeater as the radio relay station 110 and the arrangement of the cell 100A, and based on the estimation result of the Doppler shift, correction information on frequency (frequency offset direction and amount) to be corrected at the service-link transmission point or service-link reception point of the slave repeater of the HAPS 10 is changed for each cell 100A. According to the present embodiment, even when the Doppler shift of the reception signal due to the relative movement of the HAPS 10 with respect to the terminal apparatus 61 is different for each cell 100A, it is possible to suppress the deterioration in communication quality due to the Doppler shift in the plurality of cells 100A.

It is noted that, the estimation of the Doppler shift and the frequency correction for each cell 100A may be applied to either one of the downlink signal and the uplink signal in the service link between the HAPS 10 and the terminal apparatus 61, or may be applied to both. Further, the frequency offset (direction and amount) used for the correction is set every cell 100A one by one. Therefore, the frequency offset (direction and amount) may be, for example, determined with reference to a center point of the cell 100A.

Figure 12A:
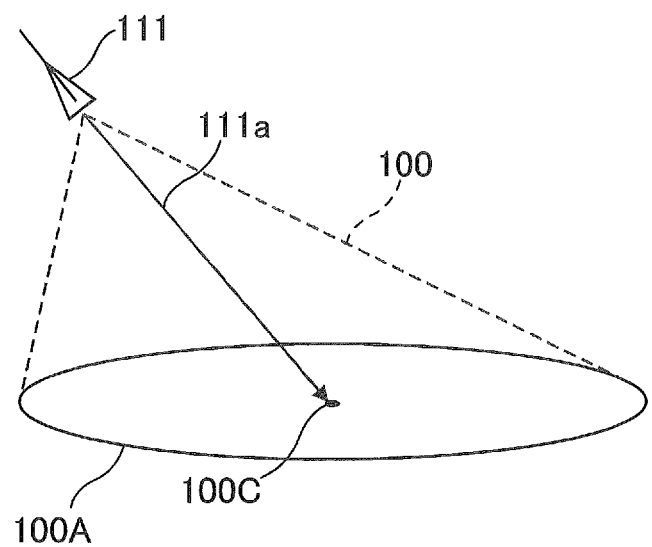
FIG. 12A is an explanatory diagram showing an example of definition of center value of a cell used as a reference for determining a frequency offset.

Herein, as shown in FIG. 12A, a definition of the center point of the cell 100A may be a geometric center value 100C in an estimated shape of the cell 100A by estimating a shape of the cell 100A based on a directivity pattern 111a of the 3D cell-formation antenna section (hereinafter also referred to as "antenna") 111 of the slave repeater and map information.

Figure 12B:
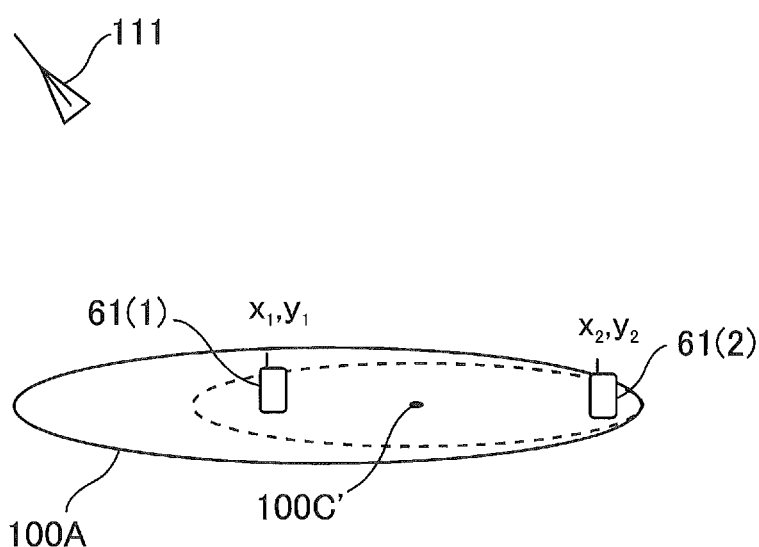
FIG. 12B is an explanatory diagram showing an example of definition of center value of a cell used as a reference for determining a frequency offset.

As shown in FIG. 12B, the frequency offset (direction and amount) may be determined with reference to the estimated center value 100C' of the position distribution of the plurality of terminal apparatuses (users) by estimating a center value of a position distribution of the plurality of terminal apparatuses (users) 61(1) and 61(2) in the cell 100A based on statistical index values (for example, median value of x and y coordinates calculated based on GPS position information) of current position information of the plurality of terminal apparatuses (users) 61(1) and 61(2) existing under the cell 100A.

In the example of FIG. 12A, for example, the shape of the cell 100A formed on the ground or on the sea is estimated using map information, an antenna-directivity pattern data, and GPS information of the HAPS 10 which is stored inside an estimation section provided in the master repeater (feeder station) 71 described later, the geometric center value 100C in the estimated shape of the cell 100A is calculated, and the center value 100C is used as a reference for the frequency offset.

In the example of FIG. 12B, for example, the GPS information of the terminal apparatus 61 on the ground is reported to the server 86, an effective center value 100C' of the cell 100A is calculated from the position distribution of the plurality of terminal apparatuses 61 (users), and the effective center value 100C' is used as a reference for the frequency offset.

Figure 13A:
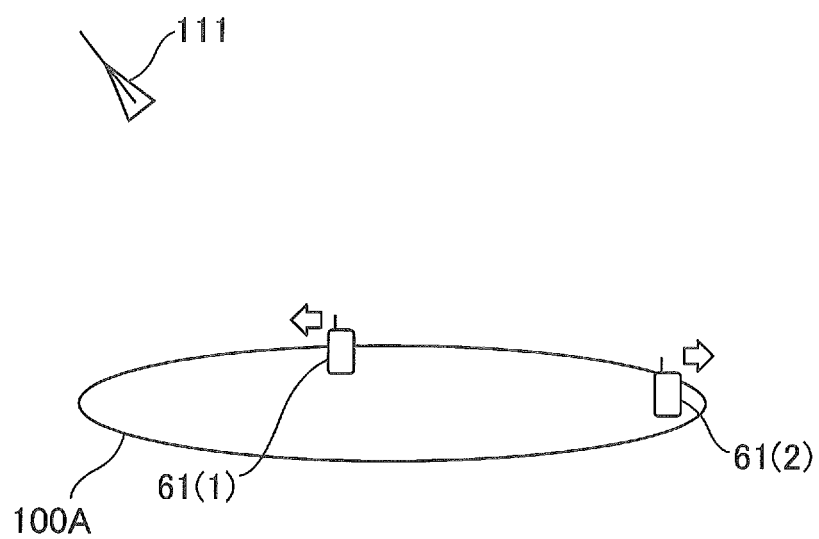
FIG. 13A is an explanatory diagram and a graph showing an example of a method for determining a frequency offset.
Figure 13B:
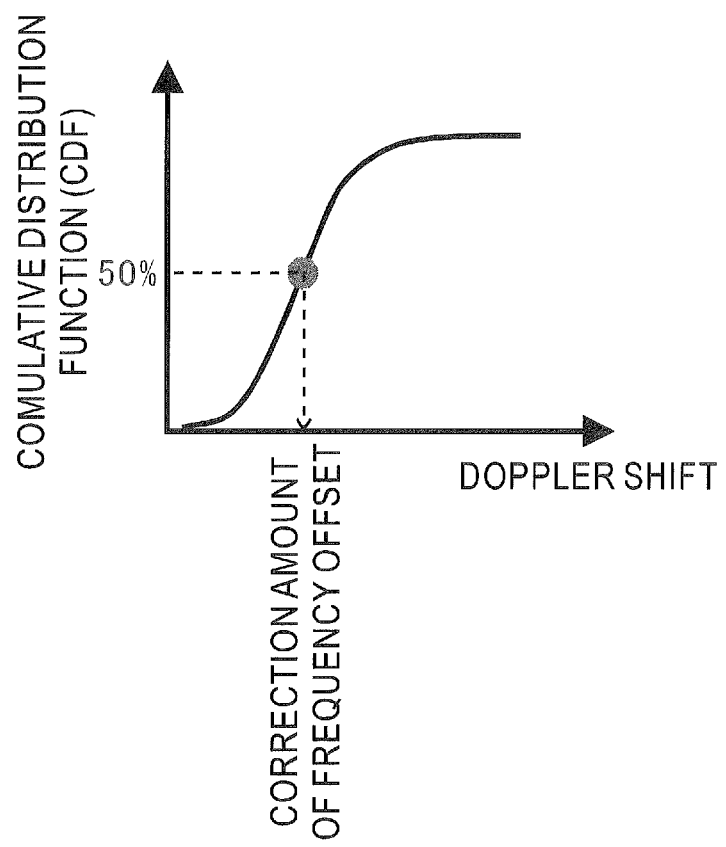
FIG. 13B is an explanatory diagram and a graph showing an example of a method for determining a frequency offset.
Figure 14:
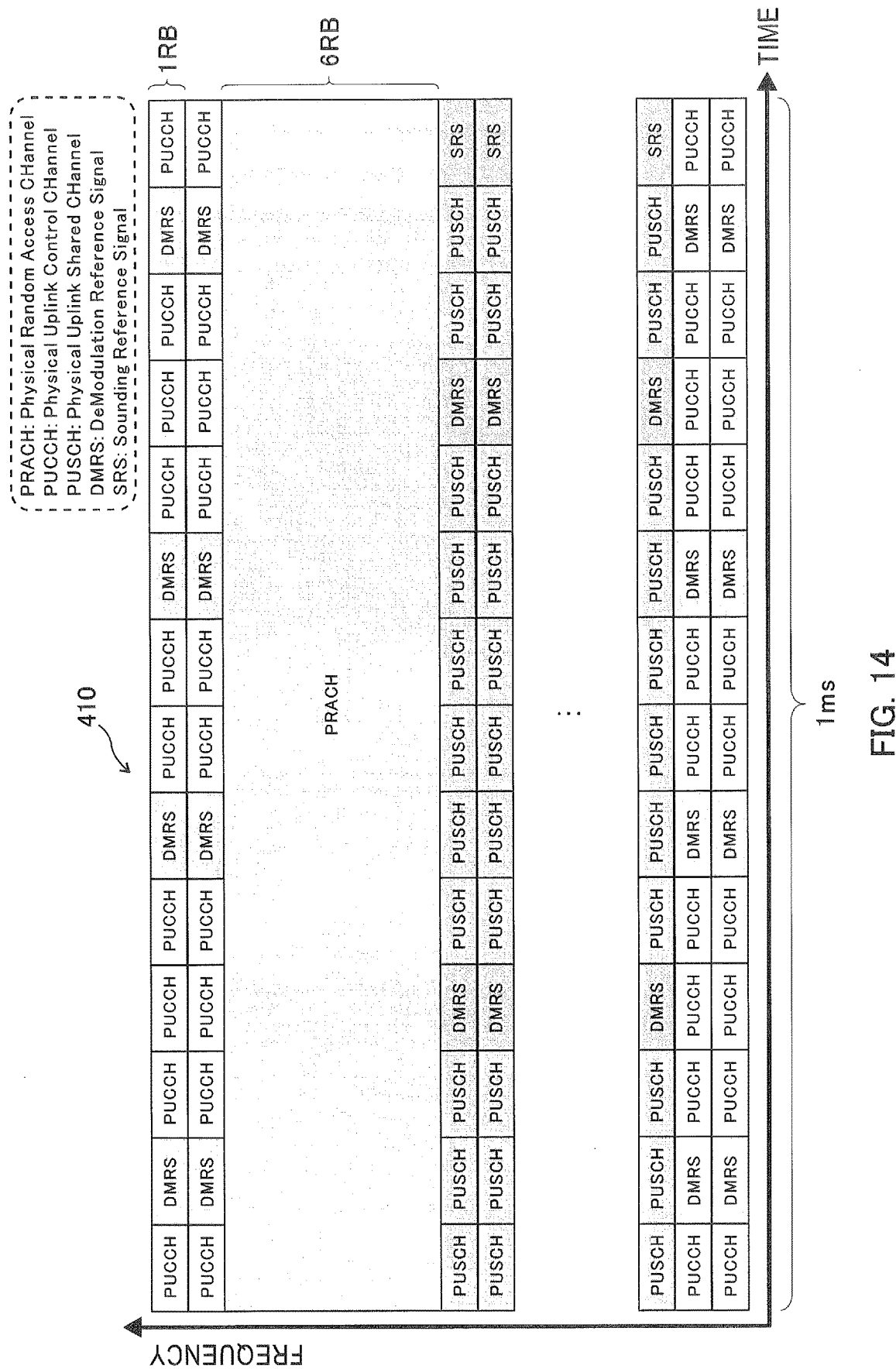
FIG. 14 is an explanatory diagram showing an example of LTE uplink format.

The frequency offset may be, for example, as shown in FIG. 13A and FIG. 13B, determined based on an uplink reference signal (for example, PRACH, SRS, DMRS in an uplink signal format 410 conforming to the LTE standard of FIG. 14) from each terminal apparatus 61 (user) in each cell 100A or the like, or a statistical index (for example, a median value of the Doppler shift at which CDF (cumulative distribution function) in FIG. 13B becomes 50%) of the Doppler shift calculated from the GPS information.

Figure 15:
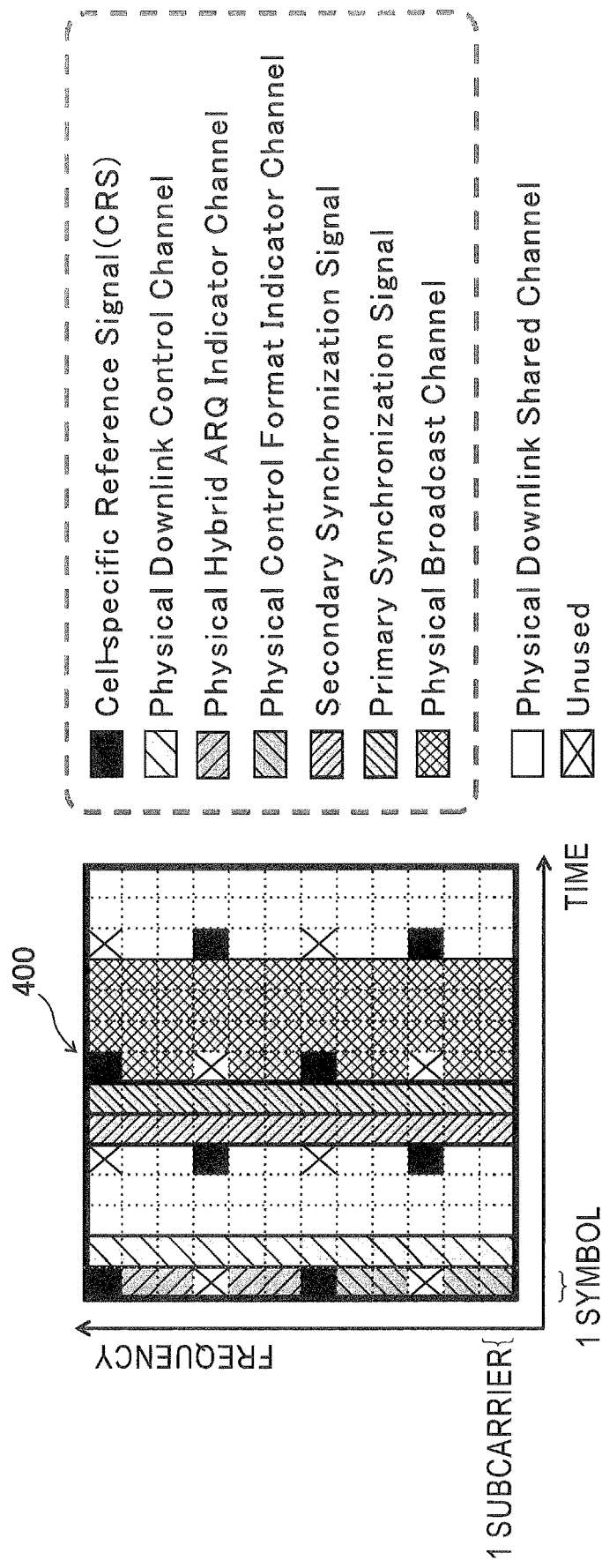
FIG. 15 is an explanatory diagram showing an example of LTE downlink format.

The frequency offset may be determined based on a downlink reference signal (for example, CRS in a downlink signal format 400 of FIG. 15) from the base station 90 or a statistical index (for example, a median value of the Doppler shift) of the Doppler shift calculated from the GPS information.

Figure 16:
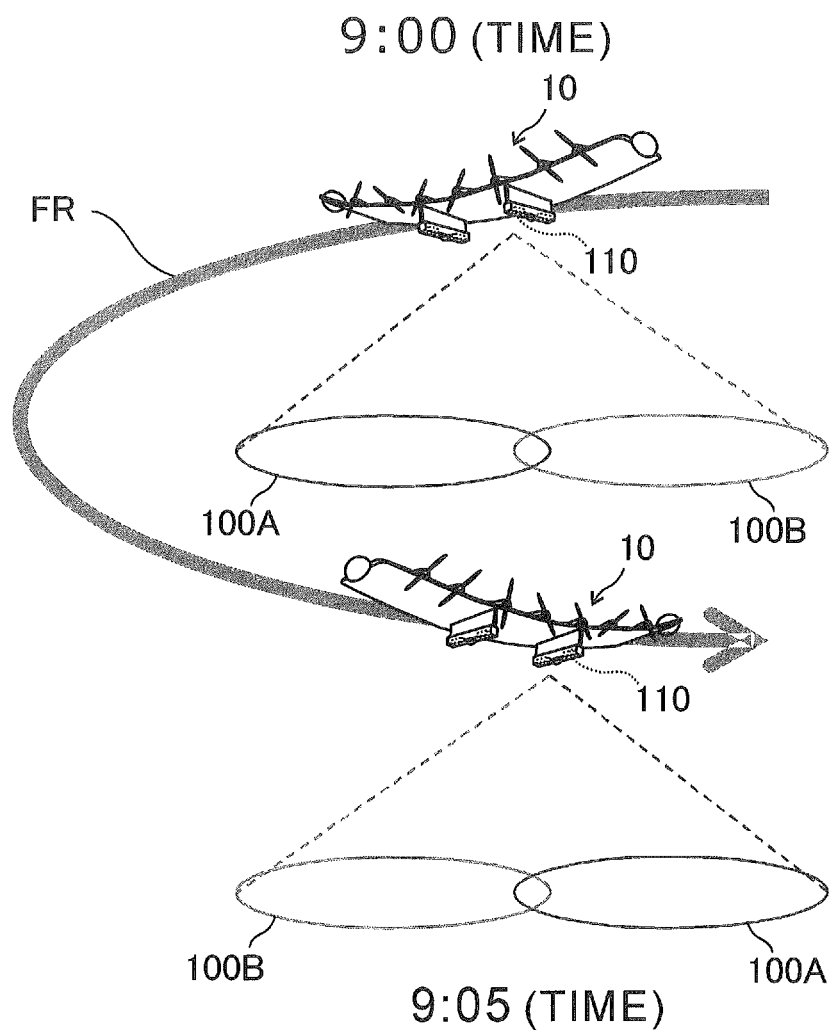
FIG. 16 is an explanatory diagram showing an example of state of HAPS flying based on flight schedule information.

In addition, as shown in FIG. 16, when flight schedule (flight plan) information in which time when the HAPS 10 flies and flight route FR (position information) are associated with each other is set in advance, based on the flight schedule information, the estimation of the Doppler shift and the correction (for example, the frequency offset (direction and amount) may be determined) of the frequency may be performed. Herein, the estimation of the Doppler shift and the correction (determination and application of frequency offset) of the frequency may be calculated based on the flight schedule information and the current time information. Further, when an accuracy of the estimation of the Doppler shift and the correction of the frequency based on the flight schedule information is low, it may be combined with the estimation of the Doppler shift and the correction of the frequency based on the reference signal or the GPS position information described above. For example, the precise estimation of the Doppler shift and the correction of the frequency based on the reference signal and the GPS position information described above may be performed at a relatively long first time interval such that an increase in reporting frequency of the GPS information does not become a problem, and the estimation of the Doppler shift and the correction of the frequency based on the flight schedule information may be supplemented by performing at a second time interval that is shorter than the first time interval. Further, the estimation of the Doppler shift and the correction of the frequency based on the flight schedule information may be performed under an initiative of the server 86 in the mobile communication network 80, or may be performed autonomously within the HAPS 10 by storing the flight schedule information in the HAPS 10.

In other embodiments, for each of the plurality of terminal apparatuses 61 located in the plurality of cells 100A, the Doppler shift in the radio communication between the terminal apparatus 61 and the HAPS 10 is estimated, and for each of the plurality of terminal apparatuses 61 (users), the frequency of the radio communication between the terminal apparatus 61 and the HAPS 10 is corrected based on the estimation result of the Doppler shift. According to the present embodiment, even when the Doppler shift of the reception signal due to the relative movement of the HAPS 10 with respect to the terminal apparatus 61 is different for each terminal apparatus 61 in the cell, it is possible to suppress a deterioration in communication quality due to the Doppler shift in each terminal apparatus 61.

Figure 17A:
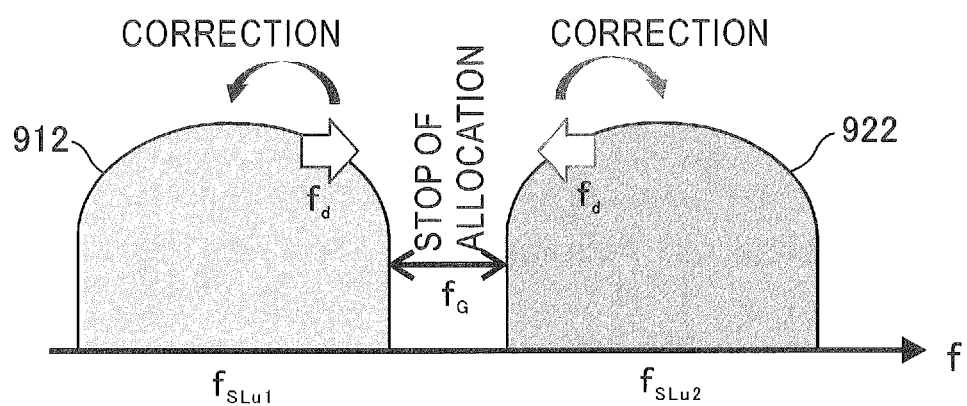
FIG. 17A is an explanatory diagram showing an example of uplink resource-allocation control and Doppler-shift correction control performed for each terminal apparatus.
Figure 17B:
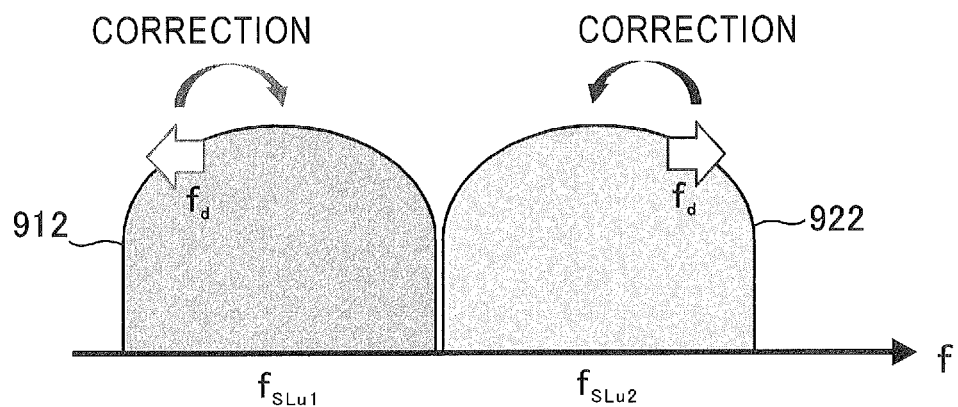
FIG. 17B is an explanatory diagram showing an example of uplink resource-allocation control and Doppler-shift correction control performed for each terminal apparatus.

Each of FIG. 17A and FIG. 17B is an explanatory diagram showing an example of an uplink resource-allocation control and a Doppler-shift correction control performed for each terminal apparatus.

In the example of FIG. 17A, by the base station 90 described above (see FIG. 9), with respect to the uplink transmission signals 912 and 922 from the plurality of terminal apparatuses 61(1) and 61(2), the resource-allocation control is performed so as to prevent an interference between carriers by adaptively providing a guard carrier $f_G$ having a predetermined width on the frequency axis by stopping the resource allocation. Herein, the width of the guard carrier $f_G$ is set such that the uplink transmission signals 912 and 922 from the terminal apparatuses 61(1) and 61(2) do not overlap each other even when a Doppler shift $f_d$ occurs.

In the example of FIG. 17B, by the base station 90, the resource-allocation control is performed adaptively according to a direction of the Doppler shift $f_d$ so that the uplink transmission signals 912 and 922 from the plurality of terminal apparatuses 61(1) and 61(2) do not overlap each other on the frequency axis.

In each of the examples of FIG. 17A and FIG. 17B, for example, by the base station 90, for each terminal apparatus 61 (user), the frequency of the uplink reception signal may be corrected in a direction opposite to the Doppler shift based on the estimation result of the Doppler shift $f_d$.

Herein, various methods can be used as a Doppler-shift estimation method of each terminal apparatus (user). For example, based on at least one of a random access channel (PRACH), a channel-state estimation signal (SRS) and a reference signal for data demodulation (DMRS) in an uplink format of FIG. 14, a Doppler shift of each terminal apparatus (user) may be estimated. Moreover, based on positional information or velocity information of each of the HAPS 10 and the terminal apparatus, the Doppler shift of each terminal apparatus (user) may be estimated. Further, the flight schedule (flight plan) information of the HAPS 10 may be used for estimation of the Doppler shift of each terminal apparatus (user).

In still another embodiment, for each of a plurality of terminal groups in which the plurality of terminal apparatuses 61 located in the plurality of cells 100A are grouped, a Doppler shift in a radio communication between the terminal apparatus 61 included in the terminal group and the HAPS 10 is estimated, and for each of the plurality of terminal groups, a frequency of the radio communication between the terminal apparatus 61 included in the terminal group and the HAPS 10 is corrected based on the estimation result of the Doppler shift. According to the present embodiment, even when the Doppler shift of the reception signal due to the relative movement of the HAPS 10 with respect to the terminal apparatus 61 is different for each terminal group, it is possible to suppress a deterioration in communication quality due to the Doppler shift in each terminal group.

Herein, the plurality of terminal groups are, for example, set by grouping the plurality of terminal apparatuses 61 (users) located in the cell 100A formed by the HAPS 10 according to at least one of magnitude and direction of the Doppler shift of the terminal apparatus 61.

Further, the correction of the frequency based on the estimation result of the Doppler shift may be performed for each specific frequency block, and may be performed by dividing the terminal group by time.

Furthermore, for the plurality of terminal groups, the uplink resource-allocation control and the Doppler-shift correction control exemplified in FIG. 17A and FIG. 17B may be performed for each of the terminal groups.

Figure 18A:
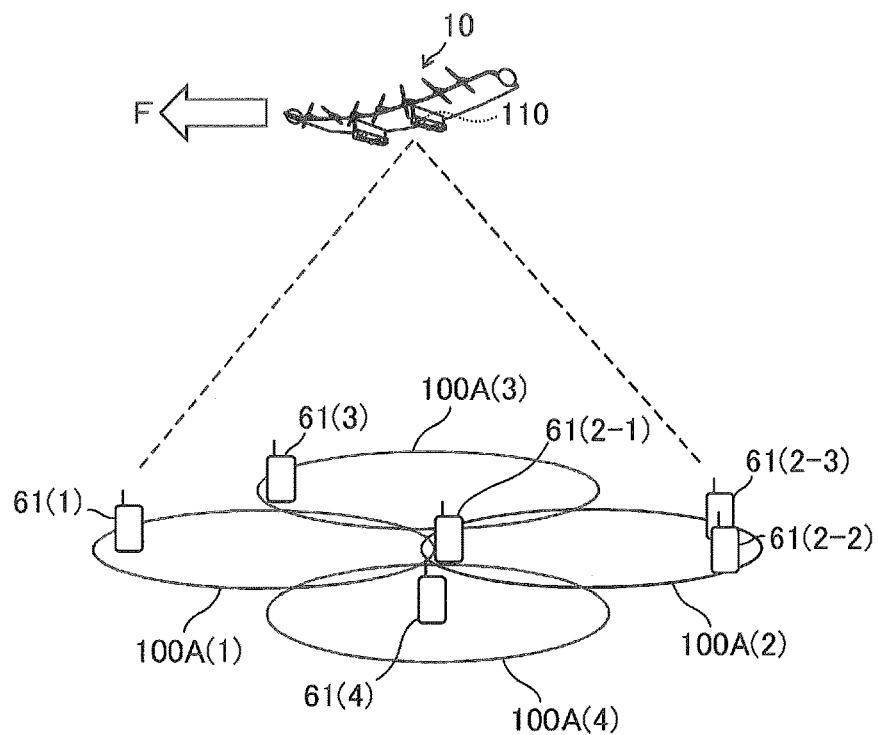
FIG. 18A is an explanatory diagram showing an example of positional relationship between a plurality of cells formed by HAPS and a plurality of terminal apparatuses grouped into terminal groups.
Figure 18B:
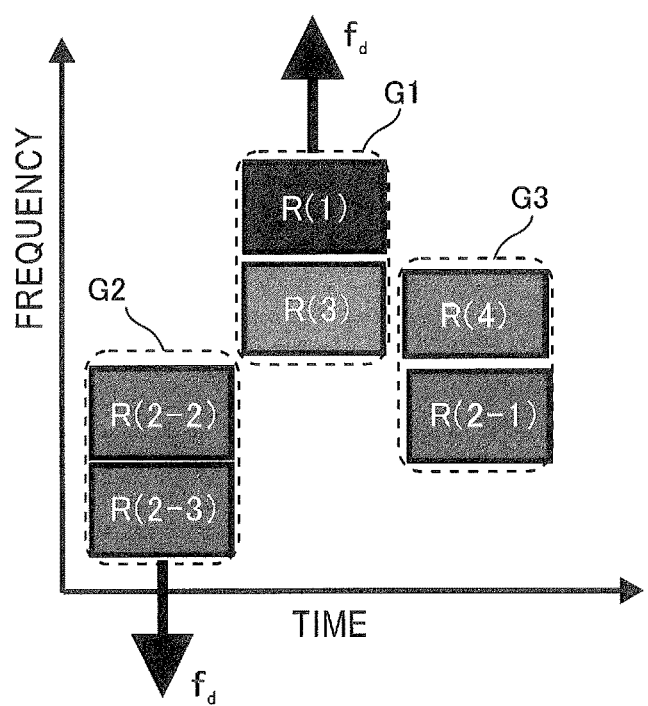
FIG. 18B is an explanatory diagram showing an example of a terminal group in which the plurality of terminal apparatuses in FIG. 18A are grouped on the time axis and the frequency axis.

FIG. 18A is an explanatory diagram showing an example of a positional relationship between the plurality of cells 100A formed by the HAPS 10 and the plurality of terminal apparatuses 61 grouped into terminal groups, and FIG. 18B is an explanatory diagram showing an example of the terminal group 62 in which the plurality of terminal apparatuses 61 in FIG. 18A are grouped on a time axis and a frequency axis.

In FIG. 18A, the radio relay station 110 of the HAPS 10 that is flying in direction F in the figure forms four cells 100A(1) to 100A(4) adjacent to each other toward the ground with the point below (center of the whole cell) as the center. Since the radio relay station of the HAPS 10 flying in the flight direction F is approaching the terminal apparatus 61(1) in the cell 100A(1) and the terminal apparatus 61(3) in the cell 100A(3) located downstream in the flight direction F, due to the Doppler phenomenon, the frequency of signals transmitted and received between the HAPS 10 and the terminal apparatuses 61(1) and 61(3) shifts to the high frequency. On the other hand, since the radio relay station of the HAPS 10 is away from the terminal apparatuses 61(2-2) and 61(2-3) in the cell 100A(2) located upstream in the flight direction F, due to the Doppler phenomenon, the frequency of signals transmitted and received between the HAPS 10 and the terminal apparatuses 61(2-2) and 61(2-3) is shifted to the low frequency. Since the relative moving velocity of the HAPS 10 with respect to the terminal apparatus 61(2-1) in the cell 100A(2) and the terminal apparatus 61(4) in the cell 100A(4) located near the center of the whole cell below the HAPS 10 is almost zero, an absolute amount of the Doppler shift is small.

A plurality of terminal apparatuses shown in FIG. 18A are, for example, grouped so as to make terminal apparatuses (users) having similar amounts and directions of the estimated Doppler-shifts one group as shown in FIG. 18B. In the example of FIG. 18B, the terminal apparatuses 61(1) and 61(3), in which the Doppler shift $f_d$ toward the high frequency is generated, are classified into a first terminal group G1. The terminal apparatuses 61(2-2) and 61(2-3), in which the Doppler shift $f_d$ toward the low frequency is generated, are classified into a second terminal group G2. The terminal apparatuses 61(2-1) and 61(4) having a small Doppler shift $f_d$ are classified into a third terminal group G3. As in the third terminal group G3, even if the cell where the terminal apparatus is located is different, it is possible to perform the grouping because the Doppler shift $f_d$ is small if it is near the center of the whole cell.

For the terminal apparatuses 61(1) and 61(3) of the first terminal group G1, the above-described base station 90 (see FIG. 9) performs the allocation control of resources R(1) and R(3) for preventing the above-described inter-carrier interference. For the terminal apparatuses 61(1) and 61(3) of the second terminal group G2, the base station 90 performs the allocation control of resources R(1) and R(3) for preventing the above-described inter-carrier interference. Further, for the terminal apparatuses 61(2-1) and 61(4) of the third terminal group G3, the base station 90 performs the allocation control of the resources R(2-1) and R(4) for preventing the above-described inter-carrier interference.

Furthermore, in the present example, for each of the first terminal group G1H and the second terminal group G2 in which the Doppler shift occurs, the frequency is corrected to be offset in an opposite direction to the Doppler shift based on an estimation result of the Doppler shift $f_d$ for each terminal group at different times. As in this correction example, it is more efficient to divide each terminal group into different times and correct them together, rather than multiplexing the ones with large Doppler shifts and opposite shift directions at the same time and correcting them individually.

Figure 19A:
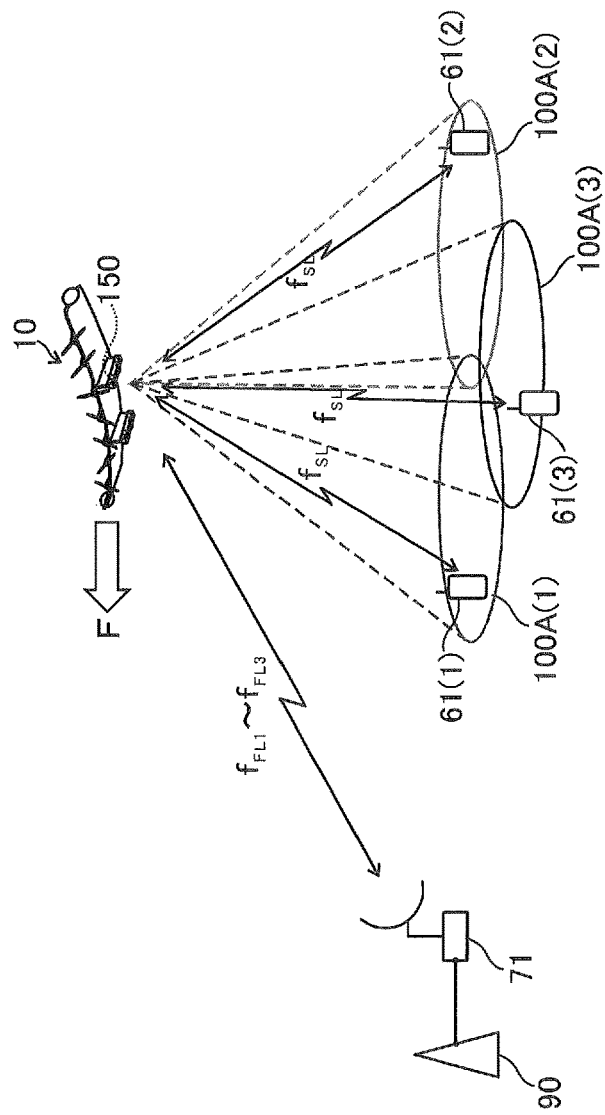
FIG. 19A is an explanatory diagram showing an example of frequency conversion in a master repeater (feeder station) and a slave repeater (radio relay station of HAPS) in a communication system according to the present embodiment.
Figure 19B:
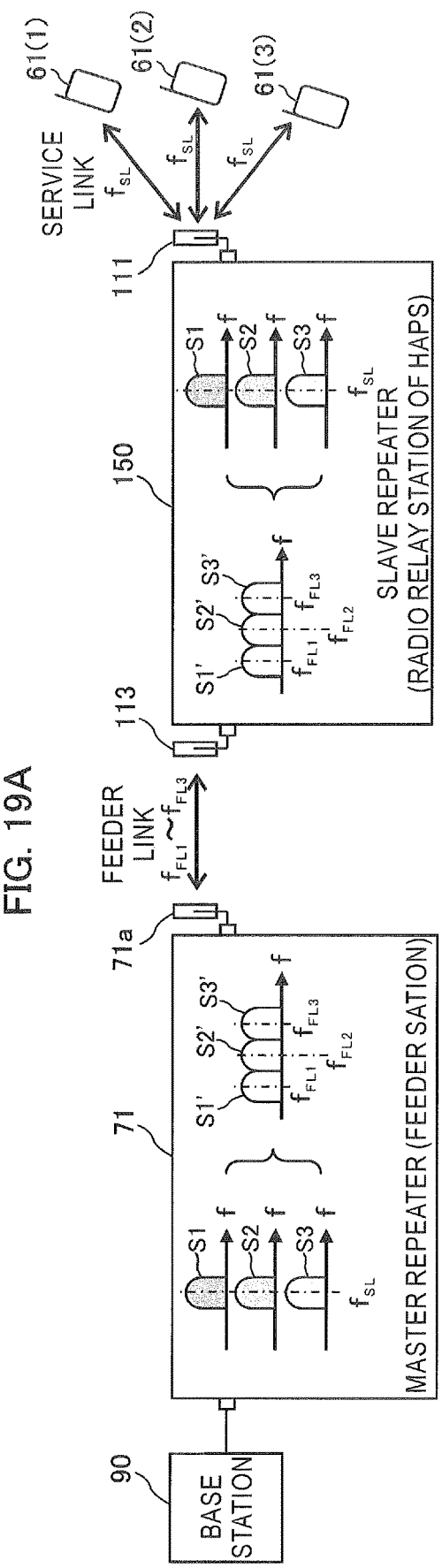
FIG. 19B is an explanatory diagram showing an example of frequency conversion in a master repeater (feeder station) and a slave repeater (radio relay station of HAPS) in a communication system according to the present embodiment.

FIG. 19A and FIG. 19B are explanatory diagrams showing an example of frequency conversion in the master repeater (feeder station) 71 and a slave repeater (radio relay station of the HAPS 10) 150 of the communication system according to the present embodiment. In FIG. 19A and FIG. 19B, although an example in which the slave repeater 150 as a radio relay station of the HAPS 10 forms three cells 100A(1) to 100A(3) is shown, the number of cells formed by the slave repeater 150 may be two cells or four or more cells.

In FIG. 19A and FIG. 19B, when the master repeater 71 on the ground receives transmission signals S1 to S3 of frequency $f_{SL}$ transmitted to the terminal apparatuses 61(1) to 61(3) of each of the cells 100A(1) to 100A(3) from the base station 90, the master repeater 71 on the ground converts frequency of each signal into different frequencies $f_{FL1}$, $f_{FL2}$, and $f_{FL3}$ so that each signal does not interfere with each other in the feeder link. The master repeater 71 transmits transmission signals S1' to S3' of the frequency $f_{FL1}$ to $f_{FL3}$ of the feeder link after frequency conversion from an antenna 71a to the HAPS 10. When the slave repeater 150 of the HAPS 10 receives the transmission signals S1' to S3' of the feeder link frequencies $f_{FL1}$ to $f_{FL3}$ from the master repeater 71 via the feeder antenna section 113, the slave repeater 150 converts the frequencies $f_{FL1}$, $f_{FL2}$, and $f_{FL3}$ of each signal into the original frequency $f_{SL}$. The slave repeater 150 transmits the transmission signals S1 to S3 of the frequency $f_{SL}$ of the service link after the frequency conversion, from the 3D cell-formation antenna section 111 to the terminal apparatuses 61(1) to 61(3) of the cells 100A(1) to 100A(3).

Figure 20:
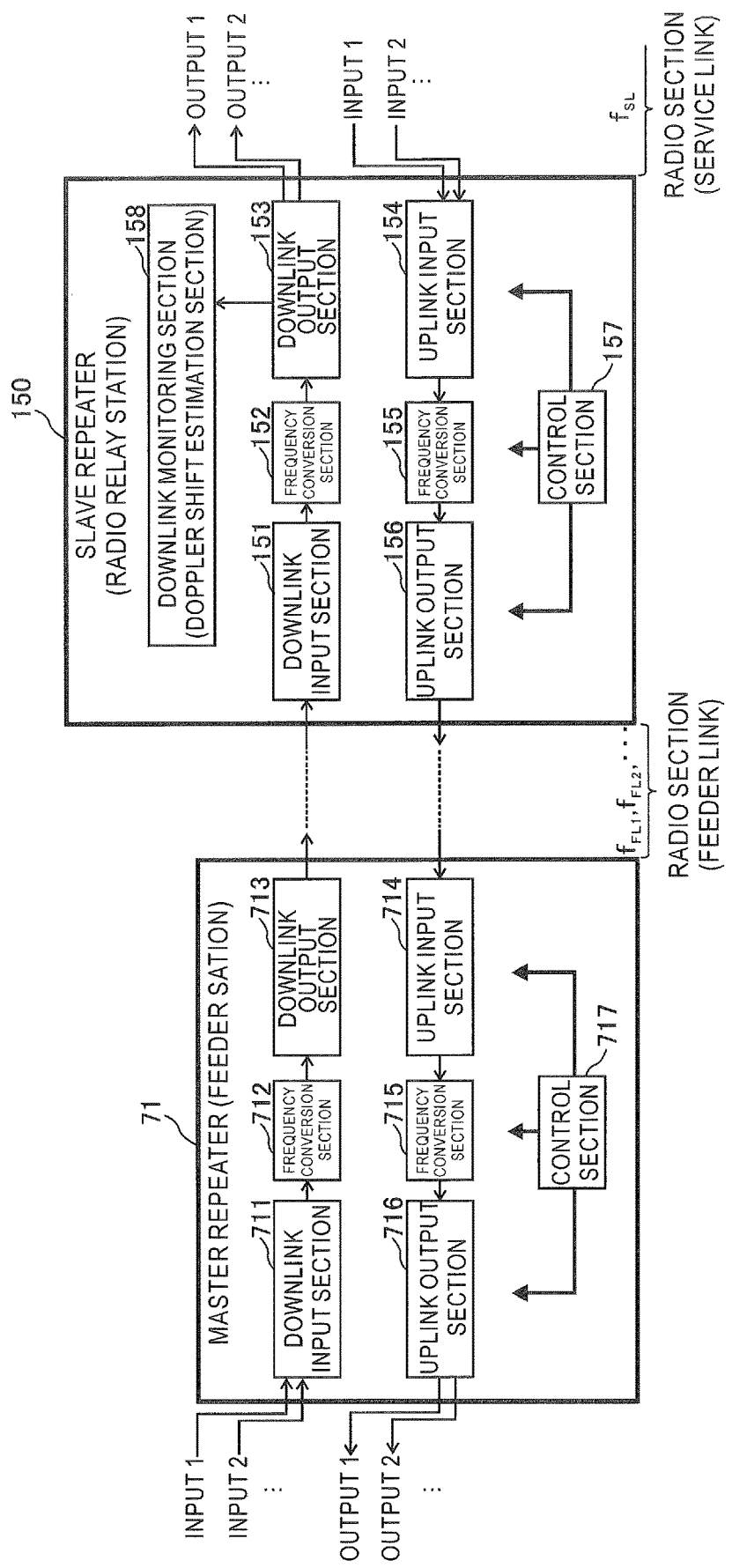
FIG. 20 is a block diagram showing an example of a configuration of a communication system for performing a Doppler-shift correction control according to the present embodiment.
Figure 21:
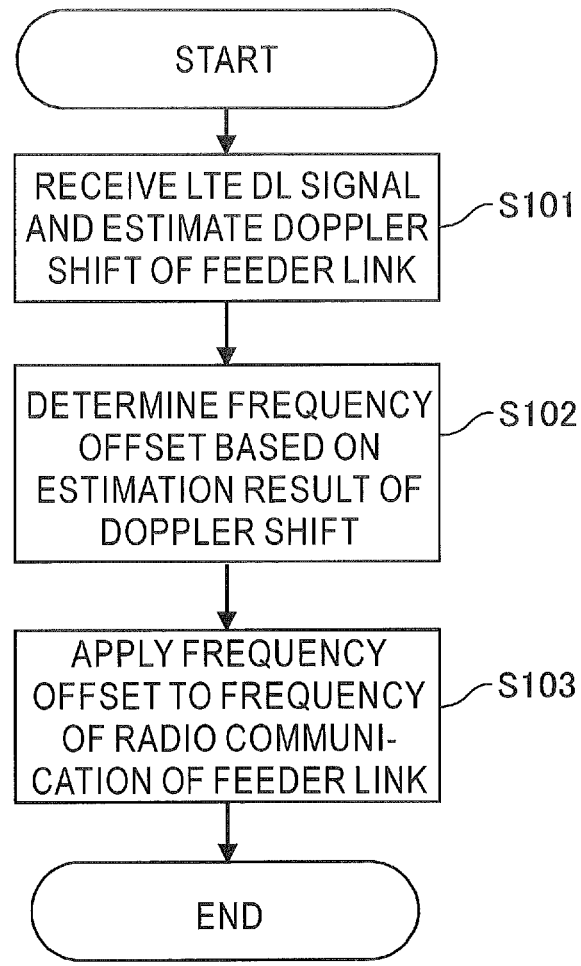
FIG. 21 is a flowchart showing an example of the Doppler-shift correction control of FIG. 20.

FIG. 20 is a block diagram showing an example of a configuration of a communication system for performing a Doppler-shift correction control according to the present embodiment. FIG. 21 is a flowchart showing an example of the Doppler-shift correction control of FIG. 20. The example of FIG. 20 and FIG. 21 is an example in which the slave repeater 150 as a radio relay station of the HAPS 10 estimates the Doppler shift of the service link, and performs a Doppler-shift correction control for correcting frequency of at least one of a downlink signal and an uplink signal based on the estimation result of the Doppler shift.

In FIG. 20, the slave repeater 150 is provided with a downlink input section 151, a frequency conversion section 152, a downlink output section 153, an uplink input section 154, a frequency conversion section 155, an uplink output section 156, and a control section 157 for controlling each section. The downlink input section 151, the frequency conversion section 152 and the downlink output section 153 relay a downlink signal conforming to the LTE, and the uplink input section 154, the frequency conversion section 155 and the uplink output section 156 relay an uplink signal conforming to the LTE. The slave repeater 150 is also provided with a downlink monitoring section 158 functioned as an estimation section that monitors a downlink signal to be relayed in a downlink output section on the service link and estimates a Doppler shift of the feeder link based on a frequency of the downlink signal. Each of the downlink input section 151, the downlink output section 153, the uplink input section 154 and the uplink output section 156 has an amplifier function for amplifying a relay target signal of a predetermined frequency to a predetermined level. The downlink input section 151 and the uplink output section 156 on the feeder link are connected to a feeder antenna section. The downlink output section 153 and the uplink input section 154 on the service link are connected to the D cell-formation antenna section that can handle a plurality of cells formed by the HAPS 10.

The master repeater 71 is provided with a downlink input section 711, a frequency conversion section 712, a downlink output section 713, an uplink input section 714, a frequency conversion section 715, an uplink output section 716, and a control section 717 for controlling each section. The downlink input section 711, the frequency conversion section 712 and the downlink output section 713 relay a downlink signal conforming to the LTE, and the uplink input section 714, the frequency conversion section 715 and the uplink output section 716 relay an uplink signal conforming to the LTE. Each of the downlink input section 711, the downlink output section 713, the uplink input section 714 and the uplink output section 716 has an amplifier function for amplifying a relay target signal of a predetermined frequency to a predetermined level. The downlink output section 713 and the uplink input section 714 on the feeder link are connected to a feeder link antenna section, and the downlink input section 711 and uplink output section 176 on the base station are connected to a communication interface section for communicating with the base station.

The downlink monitoring section 158 of the slave repeater 150 receives a downlink signal in the downlink output section 153, estimates a Doppler shift (shift direction and shift amount) of the feeder link (S101 in FIG. 21), and transmits the estimation result to the control section 157. The control section 157, which received the estimation result of the Doppler shift, determines a frequency offset (offset direction and magnitude) to be applied to at least one of a downlink signal and an uplink signal of a feeder link based on the estimation result of the Doppler shift, and performs a control so as to notify correction information including the frequency offset to the master repeater 71 (S102 in FIG. 21). The frequency offset of the correction information is information for performing a correction to shift the frequency of each of the downlink signal and the uplink signal transmitted to and received from via the feeder link in the direction opposite to the estimated Doppler shift. The slave repeater 150 may notify the correction information to the master repeater 71 via the feeder link as an uplink signal, and may notify the correction information using a dedicated separate line (separate link). The control section 717 of the master repeater 71, based on the correction information received from the slave repeater 150, controls the downlink output section 713 so as to correct the frequencies $f_{FL1}$, $f_{FL2}$, . . . of the downlink signal of the feeder link by applying the frequency offset (S103 in FIG. 21). Further, the control section 717 of the master repeater 71, based on the correction information received from slave repeater 150, controls the uplink input section 714 so as to correct the frequencies $f_{FL1}$, $f_{FL2}$, . . . of the uplink signal of the feeder link by applying the frequency offset (S103 in FIG. 21).

It is noted that, in FIG. 20 and FIG. 21, the slave repeater 150 may correct the Doppler shift of the feeder link without notifying the correction information including the frequency offset from the slave repeater 150 to the master repeater 71. For example, the control section 157 of the slave repeater 150 may control the downlink input section 151 so as to correct the frequencies $f_{FL1}$, $f_{FL2}$, . . . of the downlink signal of the feeder link by applying the frequency offset. Moreover, the control section 157 may control the uplink output section 156 so as to correct the frequencies $f_{FL1}$, $f_{FL2}$, . . . of the uplink signal of the feeder link by applying the frequency offset.

In FIG. 20 and FIG. 21, the determination of the frequency offset may be performed not by the downlink monitoring section 158 of the slave repeater 150, but by at least one of the downlink output section 713 and the uplink input section 714 of the master repeater 71 for correcting the Doppler shift, and the downlink input section 151 and the uplink output section 156 of the slave repeater 150.

In FIG. 20 and FIG. 21, the frequency correction using the frequency offset may be performed based on the estimation result from the downlink monitoring section 158 by at least one of the downlink output section 713 and the uplink input section 714 of the master repeater 71, and the downlink input section 151 and the uplink output section 156 of the slave repeater 150, without going through the control sections 157 and 717.

In FIG. 20 and FIG. 21, the estimation of the Doppler shift in the feeder link may be performed by the master repeater 71 instead of the slave repeater 150. For example, the master repeater 71 may be provided with an uplink monitoring section for receiving an uplink signal in the uplink input section 714 and estimating a Doppler shift (shift direction and shift amount), and the Doppler shift of the feeder link may be corrected based on the estimation result of the Doppler shift in the uplink monitoring section.

Figure 22:
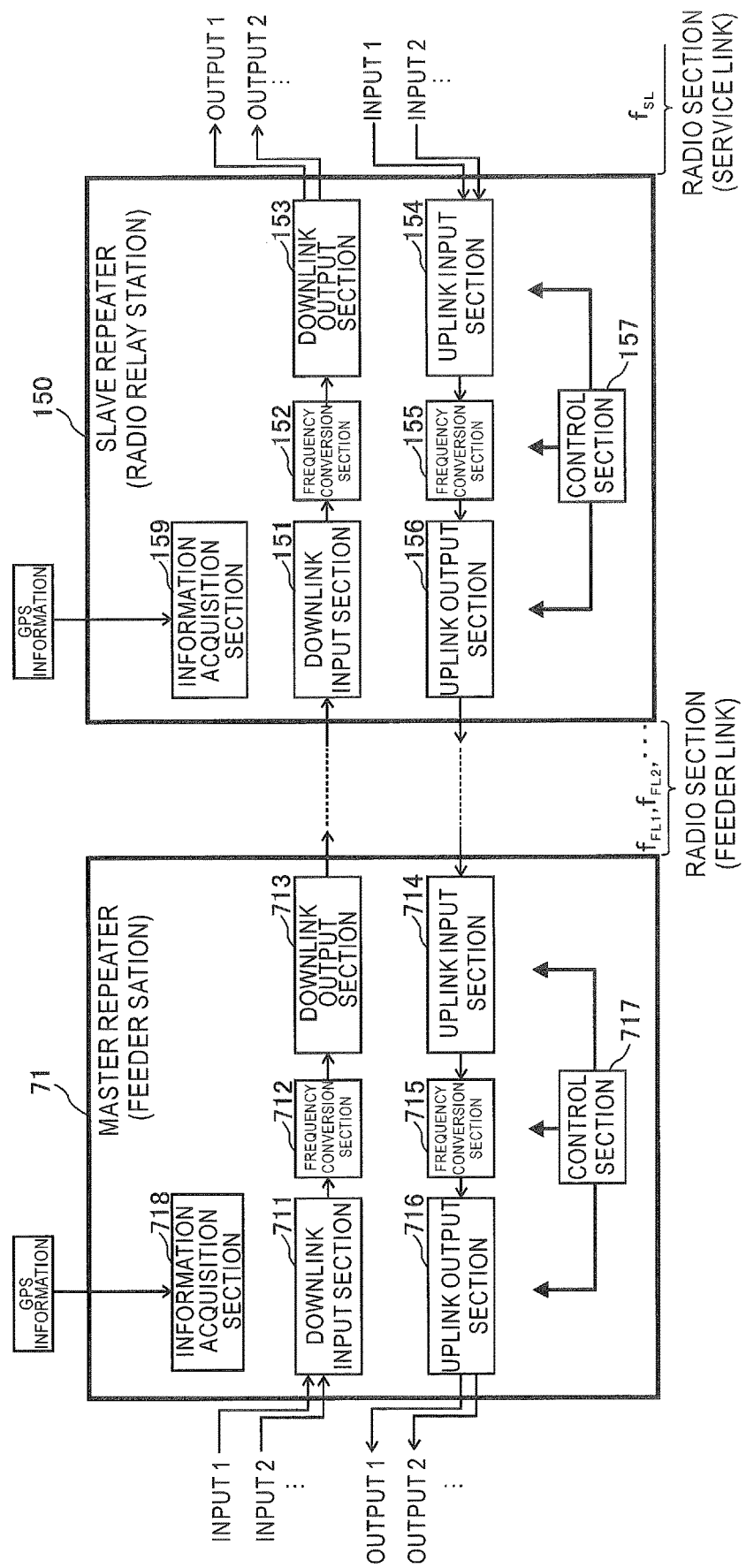
FIG. 22 is a block diagram showing another example of a configuration of a communication system for performing a Doppler-shift correction control according to the present embodiment.
Figure 23:
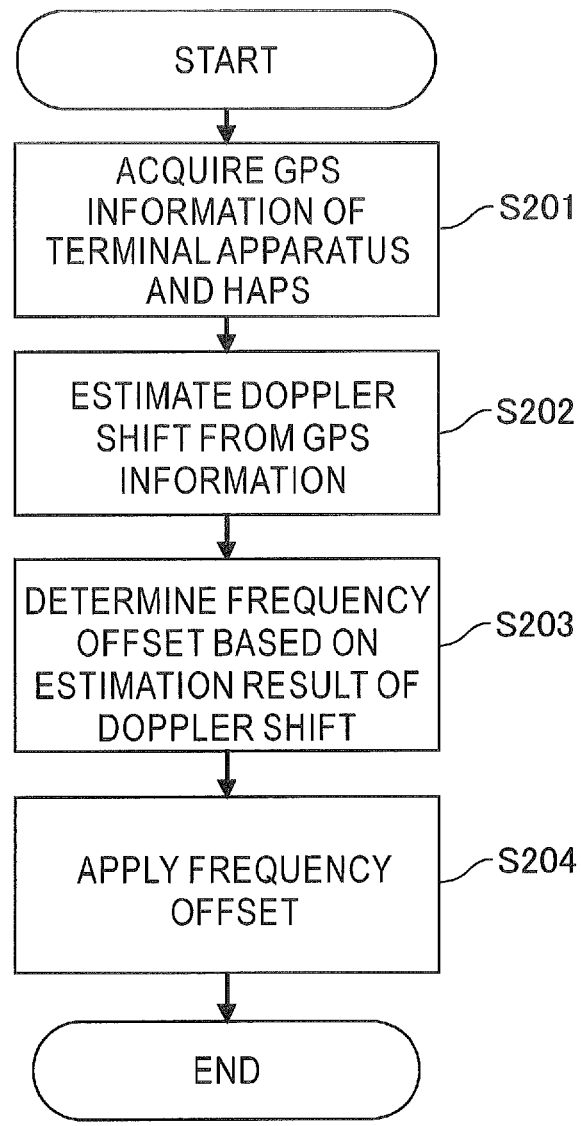
FIG. 23 is a flowchart showing an example of the Doppler-shift correction control of FIG. 22.

FIG. 22 is a block diagram showing another example of a configuration of a communication system for performing a Doppler-shift correction control according to the present embodiment. FIG. 23 is a flowchart showing an example of the Doppler-shift correction control of FIG. 22. The example of FIG. 22 and FIG. 23 is an example in which a Doppler shift of a service link and a feeder link is estimated based on GPS information as current position information of each of the HAPS 10 on which the slave repeater 150 is mounted, the terminal apparatus 61 and the master repeater 71 on the ground, and the slave repeater 150 and the master repeater 71 on the ground correct a frequency of a downlink signal and an uplink signal based on the estimation result of the Doppler shift. It is noted that, in FIG. 22, with respect to the description common to FIG. 20 described above, explanation thereof will be omitted.

In FIG. 22, the master repeater 71 and the slave repeater 150 are respectively provided with information acquisition sections 718 and 159 for acquiring GPS information from a server or the like instead of including the downlink monitoring section 158. The information acquisition sections 718 and 159 may be configured using, for example, a communication terminal apparatus for control (for example, a mobile-communication terminal module conforming to the LTE or the 5G standards). The server collects the GPS information reported from each of the terminal apparatus 61, the HAPS 10 and the master repeater 71 via the core network or the like.

For example, the information acquisition section 159 of the slave repeater 150 acquires the GPS information from the server or the like and transmits it to the control section 157. The control section 157 estimates a distribution of the terminal apparatuses 61 (users), and estimates the Doppler shift (shift direction and shift amount) for each of the cells, each terminal apparatus or each terminal group in the service link, based on the GPS information received from the information acquisition section 159 (S201 and S202 in FIG. 23). The control section 157 determines a frequency offset (direction and amount of an offset) to be applied to at least one of the downlink signal and the uplink signal of the service link for each of the cells, for each terminal apparatus or for each terminal group, based on the estimation result of the Doppler shift (S203 in FIG. 23). Further, the control section 157 controls the downlink output section 153 so as to correct the frequency $f_{SL}$ of the downlink signal of the service link by applying the frequency offset for each of the cells, for each terminal apparatus or for each terminal group (S204 in FIG. 23). In addition, the control section 157 controls the uplink input section 154 so as to correct the frequency $f_{SL}$ of the uplink signal of the service link by applying the frequency offset for each of the cells, for each terminal apparatus or for each terminal group (S204 in FIG. 23).

For example, the slave repeater 150 may perform a Doppler shift-correction of the downlink signal and the uplink signal of the feeder link based on the GPS information acquired from the server or the like. The control section 157 of the slave repeater 150 estimates the Doppler shift (shift direction and shift amount) in the feeder link based on the GPS information received from the information acquisition section 159 (S201 and S202 in FIG. 23). The control section 157 determines a frequency offset (direction and magnitude of an offset) to be applied to at least one of the downlink signal and the uplink signal of the feeder link, based on the estimation result of the Doppler shift (S203 in FIG. 23). Further, the control section 157 controls the downlink input section 151 so as to correct the frequencies $f_{FL1}, f_{FL2}, \ldots$ of the downlink signal of the feeder link by applying the frequency offset (S204 in FIG. 23). Further, the control section 157 controls the uplink output section 156 so as to correct the frequencies $f_{FL1}, f_{FL2}, \ldots$ of the uplink signal of the feeder link by applying the frequency offset (S204 in FIG. 23).

For example, the master repeater 71 may perform a Doppler-shift correction of the downlink signal and the uplink signal of the feeder link based on the GPS information acquired from the server or the like. The information acquisition section 718 of the master repeater 71 acquires the GPS information from the server or the like and transmits it to the control section 717. The control section 717 estimates the Doppler shift (shift direction and shift amount) in the feeder link based on the GPS information received from the information acquisition section 718 (S201 and S202 in FIG. 23). The control section 717 determines a frequency offset (direction and magnitude of an offset) to be applied to at least one of the downlink signal and the uplink signal of the feeder link based on the estimation result of the Doppler shift (S203 in FIG. 23). Further, the control section 717 controls the downlink output section 713 so as to correct the frequencies $f_{FL1}, f_{FL2}, \ldots$ of the downlink signal of the feeder link by applying the frequency offset (S204 in FIG. 23). The control section 717 controls the uplink input section 714 so as to correct the frequencies $f_{FL1}, f_{FL2}, \ldots$ of the uplink signal of the feeder link by applying the frequency offset (S204 in FIG. 23). An acquisition of the information is performed, for example, via a dedicated link line (communication interface) such as Ethernet (registered trademark).

Further, in FIG. 22 and FIG. 23, the frequency offset may be determined by the server without being determined by the slave repeater 150 or the master repeater 71, and may be notified to the slave repeater 150 or the master repeater 71.

Figure 24:
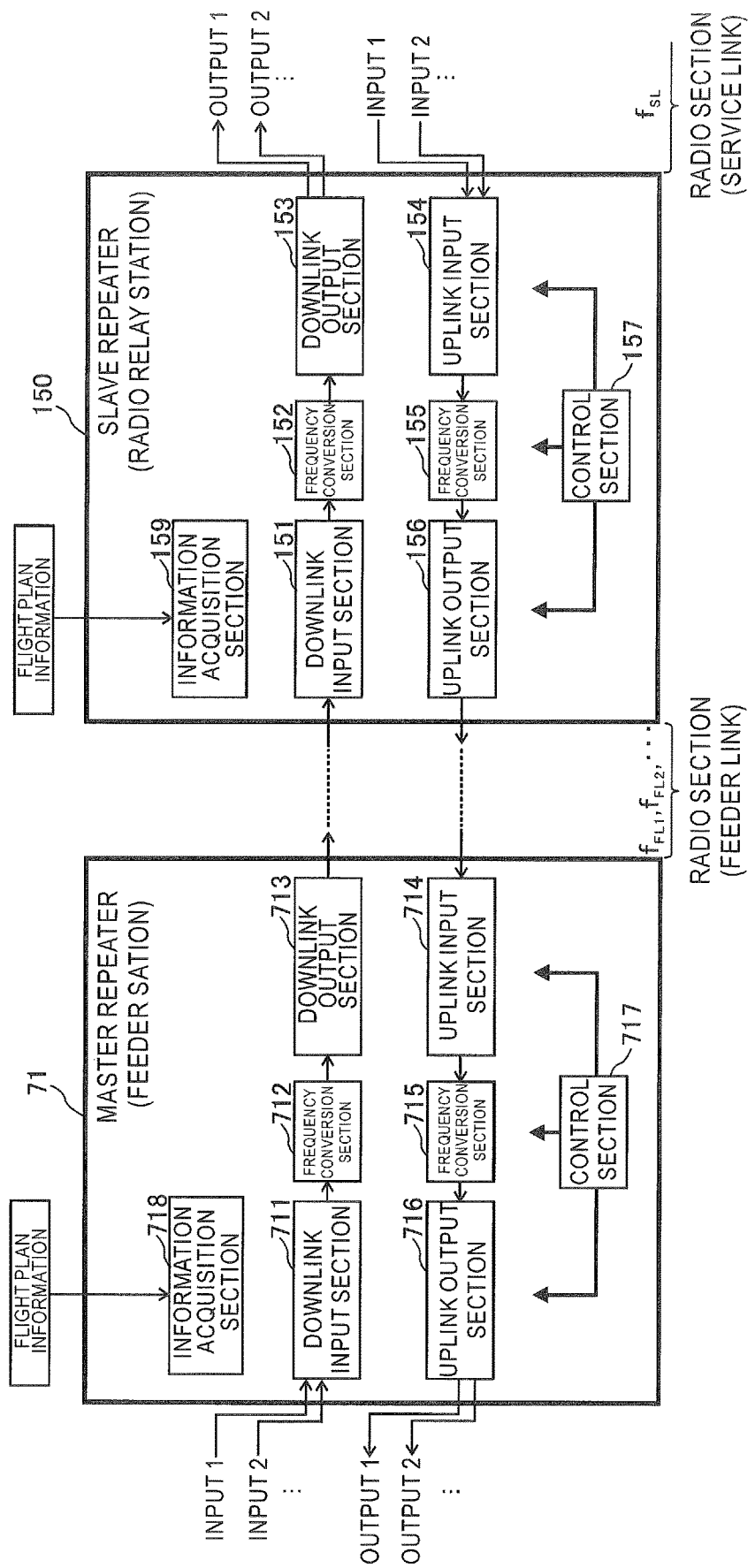
FIG. 24 is a block diagram showing still another example of a configuration of a communication system for performing a Doppler-shift correction control according to the present embodiment.
Figure 25:
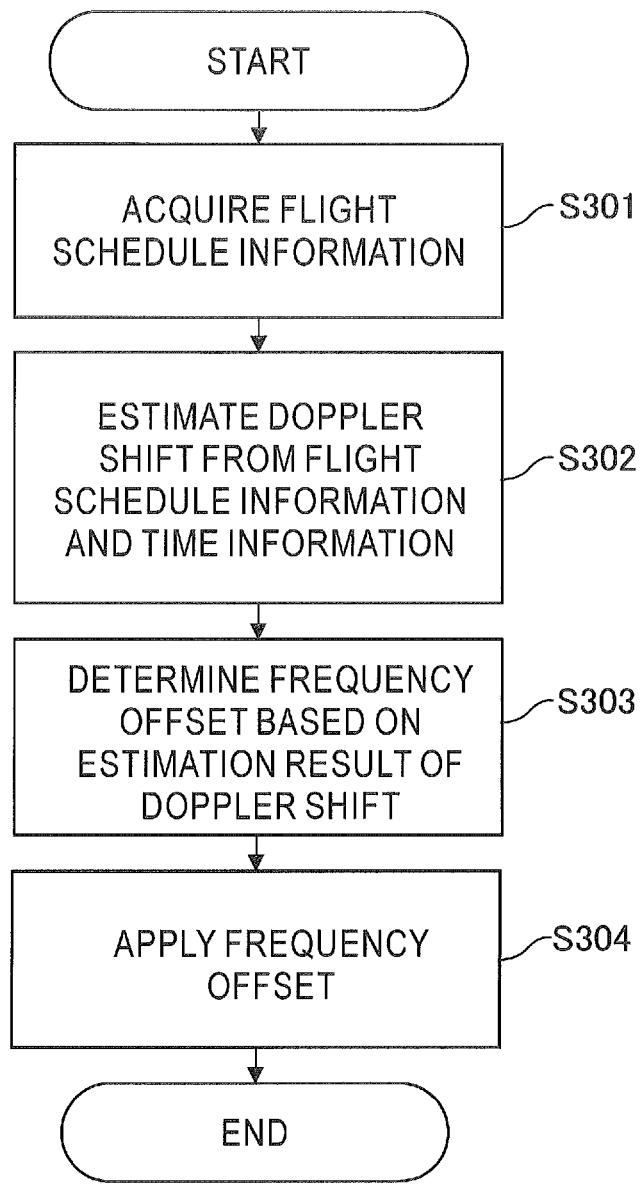
FIG. 25 is a flowchart showing an example of the Doppler-shift correction control of FIG. 24.

FIG. 24 is a block diagram showing still another example of a configuration of a communication system for performing a Doppler-shift correction control according to the present embodiment. FIG. 25 is a flowchart showing an example of the Doppler-shift correction control of FIG. 24. The example of FIG. 24 and FIG. 25 is an example in which a Doppler-shift correction control is performed to estimate a Doppler shift of a feeder link and a service link based on flight schedule (flight plan) information and current time information of the HAPS 10 equipped with the slave repeater 150 and correct a frequency of a downlink signal and an uplink signal based on the estimation result of the Doppler shift. It is noted that, in FIG. 24, with respect to the description common to those in FIG. 19A, FIG. 19B and FIG. 22 described above, explanation thereof will be omitted.

In FIG. 24, the master repeater 71 and the slave repeater 150 are respectively provided with the information acquisition sections 718 and 159 for acquiring GPS information from a server or the like instead of including the downlink monitoring section 158. The server collects flight schedule (flight plan) information of the HAPS 10 via the core network or the like.

For example, the information acquisition section 159 of the slave repeater 150 acquires the flight schedule information from the server or the like and transmits it to the control section 157. The control section 157 estimates a Doppler shift (shift direction and shift amount) for each of the cells, each terminal apparatus or each terminal group in the service link based on the flight schedule information and the current time information (S301 and S302 in FIG. 25). The control section 157 determines a frequency offset (direction and amount of an offset) to be applied to at least one of the downlink signal and the uplink signal of the service link for each of the cells, for each terminal apparatus or for each terminal group, based on the estimation result of the Doppler shift (S303 in FIG. 25). Further, the control section 157 controls the downlink output section 153 so as to correct the frequency $f_{SL}$ of the downlink signal of the service link by applying the frequency offset, for each of the cells, for each terminal device or for each terminal group (S304 in FIG. 25). In addition, the control section 157 controls the uplink input section 154 so as to correct the frequency $f_{SL}$ of the uplink signal of the service link by applying the frequency offset, for each of the cells, for each terminal apparatus or for each terminal group (S304 in FIG. 25).

For example, the slave repeater 150 may perform a Doppler-shift correction of the downlink signal and the uplink signal of the feeder link based on the flight schedule information acquired from the server or the like. The control section 157 of the slave repeater 150 estimates a Doppler shift (shift direction and shift amount) in the feeder link based on the flight schedule information received from the information acquisition section 159 and the current time information (S201 and S202 in FIG. 23). Further, the control section 157 controls the downlink input section 151 so as to correct the frequencies $f_{FL1}$, $f_{FL2}$, ... of the downlink signal of the feeder link by applying the frequency offset (S204 in FIG. 23). In addition, the control section 157 controls the uplink output section 156 so as to correct the frequencies $f_{FL1}$, $f_{FL2}$, ... of the uplink signal of the feeder link by applying the frequency offset (S204 in FIG. 23).

For example, the master repeater 71 may perform a Doppler-shift correction of the downlink signal and the uplink signal of the feeder link based on the flight schedule information acquired from the server or the like. The information acquisition section 718 of the master repeater 71 acquires the flight schedule information from the server or the like and transmits it to the control section 717. The control section 717 estimates a Doppler shift (shift direction and shift amount) in the feeder link based on the flight schedule information received from the information acquisition section 718 and the current time information (S201 and S202 in FIG. 23). The control section 717 determines a frequency offset (direction and magnitude of an offset) to be applied to at least one of the downlink signal and the uplink signal of the feeder link based on the estimation result of the Doppler shift (S203 in FIG. 23). Further, the control section 717 controls the downlink output section 713 so as to correct the frequencies $f_{FL1}$, $f_{FL2}$, ... of the downlink signal of the feeder link by applying the frequency offset (S204 in FIG. 23). In addition, the control section 717 controls the uplink input section 714 so as to correct the frequencies $f_{FL1}$, $f_{FL2}$, ... of the uplink signal of the feeder link by applying the frequency offset (S204 in FIG. 23).

It is noted that, in FIG. 24 and FIG. 25, the frequency offset may be determined by the server without being determined by the slave repeater 150 or the master repeater 71, and may be notified to the slave repeater 150 or the master repeater 71.

In the example of FIG. 19A and FIG. 19B to FIG. 24, although the case in which the radio relay station provided in the HAPS in the upper airspace is a slave repeater has been described, the radio relay station provided in the HAPS in the upper airspace may be a base station (for example, eNodeB of the LTE) of the mobile communication system.

It is noted that, the process steps and configuration elements of the radio relay station of the communication relay apparatus such as HAPSs 10 and 20, the feeder station, the remote control apparatus, the server, the terminal apparatus (user apparatus, mobile station, communication terminal) and the base station described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, base station apparatus, radio relay station apparatus, terminal apparatus (user apparatus, mobile station, communication terminal), remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-temporary recording medium. The code of the program may be read and executed by a computer, a processor, another device or an apparatus machine, and the format is not limited to a specific format. For example, the program code may be any of source code, object code, and binary code, or may be a mixture of two or more of these codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane-type)
20 HAPS (airship-type)
40 cell-formation target airspace
41, 42, 43 three-dimensional cell
50 airspace where HAPS is located
60 drone
61 terminal apparatus
61(1) to 61(4) terminal apparatus
61(2-1) to 61(2-3) terminal apparatus
62H, 62L, 62M terminal group
65 airplane
70 feeder station
71 master repeater
72 artificial satellite
80 mobile communication network
80a core network
85 remote control apparatus (control center)
86 server
90 base station (eNodeB)
100, 200, 300 beam
100A, 100A(1) to 100A(4) cell
110, 210 radio relay station
111 3D cell-formation antenna section
113 feeder antenna section
151 downlink input section
152 frequency conversion section
153 downlink output section
154 uplink input section
155 frequency conversion section
156 uplink output section
157 control section
158 downlink monitoring section
159 information acquisition section
711 downlink input section
712 frequency conversion section
713 downlink output section
714 uplink input section
715 frequency conversion section
716 uplink output section
717 control section
718 information acquisition sections

The invention claimed is:

1. A communication system having a mobile-type radio relay apparatus that is disposed movably by flying in an upper airspace, forms a plurality of cells from an antenna at a predetermined altitude toward the ground or the sea, and performs a radio communication with a terminal apparatus located in each of the plurality of cells, the communication system comprising:

an estimation section for estimating a Doppler shift in at least one of a radio communication of a service link between the terminal apparatus located in the cell and the radio relay apparatus and a radio communication of a feeder link between the radio relay apparatus and a feeder station on the ground or on the sea; and a correction section for correcting a frequency of the at least one of the radio communications based on an estimation result of the Doppler shift, wherein the estimation section estimates a shape of the cell based on map information and an antenna directivity pattern of the radio relay apparatus, and estimates the Doppler shift of the service link with respect to a geometric center point in the estimated shape of the cell, and wherein the correction section corrects the frequency of the radio communication in the service link between the terminal apparatus located in the cell and the radio relay apparatus, based on the estimation result of the Doppler shift of the service link, the Doppler shift being estimated with respect to the geometric center point of the cell.

2. The communication system according to claim 1,
wherein the estimation section or the correction section determines a frequency offset for a radio communication of at least one of an uplink and a downlink of the service link for each of the cells, based on the estimation result of the Doppler shift, and
wherein the correction section applies the frequency offset to the frequency of the radio communication for each of the cells.

3. The communication system according to claim 1,
wherein the estimation section or the correction section determines a frequency offset for a radio communication of at least one of an uplink and a downlink of the feeder link, and determines a frequency offset for a radio communication of at least one of an uplink and a downlink of the service link for each of the cells, and
wherein the correction section applies the frequency offset of the feeder link to a frequency of the radio communication of at least one of the uplink and the downlink of the feeder link, and applies the frequency offset of the service link to a frequency of the radio communication of at least one of the uplink and the downlink of the service link for each of the cells.

4. The communication system according to claim 2,
wherein the correction section is provided in the radio relay apparatus.

5. The communication system according to claim 1,
wherein the estimation section estimates the Doppler shift in the at least one of the radio communication of the service link and the radio communication of the feeder link based on flight schedule information predetermined for the radio relay apparatus.

6. The communication system according to claim 1,
wherein the estimation section estimates the Doppler shift based on at least one kind of information among information on a frequency shift of a downlink signal transmitted to the terminal apparatus via the radio relay apparatus, information on a directivity of an antenna forming the cell, information on a frequency shift of an uplink signal transmitted from the terminal apparatus via the radio relay apparatus, information on a time of changing position information of the radio relay apparatus, and flight schedule information predetermined for the radio relay apparatus.

7. The communication system according to claim 1,
wherein the radio relay apparatus is a slave repeater for performing a radio communication with a master repeater on the ground or on the sea, the master repeater being connected to a base station of a mobile communication, and wherein each of the estimation section and the correction section is provided in the master repeater on the ground or on the sea, the slave repeater or the base station.

8. The communication system according to claim 1,
wherein the radio relay apparatus is a base station of a mobile communication, and
wherein each of the estimation section and the correction section is provided in the base station.

9. The communication system according to claim 3,
wherein the correction section is provided in the radio relay apparatus.

10. A communication system having a mobile-type radio relay apparatus that is disposed movably by flying in an upper airspace, forms a plurality of cells from an antenna at a predetermined altitude toward the ground or the sea, and performs a radio communication with a terminal apparatus located in each of the plurality of cells, the communication system comprising:
an estimation section for estimating a Doppler shift in at least one of a radio communication of a service link between the terminal apparatus located in the cell and the radio relay apparatus and a radio communication of a feeder link between the radio relay apparatus and a feeder station on the ground or on the sea; and
a correction section for correcting a frequency of the at least one of the radio communications based on an estimation result of the Doppler shift,
wherein the estimation section estimates a center value of position distributions of a plurality of terminal apparatuses in the cell based on statistical index values of current position information of the plurality of terminal apparatuses in the cell, and estimates the Doppler shift of the service link with respect to the estimated center value of the position distributions of the plurality of terminal apparatuses, and
wherein the correction section corrects the frequency of the radio communication in the service link between the terminal apparatus located in the cell and the radio relay apparatus, based on the estimation result of the Doppler shift of the service link, the Doppler shift being estimated for the center value of the position distributions of the plurality of terminal apparatuses in the cell.

11. The communication system according to claim 10,
wherein the estimation section or the correction section determines a frequency offset for a radio communication of at least one of an uplink and a downlink of the service link for each of the cells, based on the estimation result of the Doppler shift, and
wherein the correction section applies the frequency offset to the frequency of the radio communication for each of the cells.

12. The communication system according to claim 10,
wherein the estimation section or the correction section determines a frequency offset for a radio communication of at least one of an uplink and a downlink of the feeder link, and determines a frequency offset for a radio communication of at least one of an uplink and a downlink of the service link for each of the cells, and
wherein the correction section applies the frequency offset of the feeder link to a frequency of the radio communication of at least one of the uplink and the downlink of the feeder link, and applies the frequency offset of the service link to a frequency of the radio communication of at least one of the uplink and the downlink of the service link for each of the cells.

13. The communication system according to claim 11,
wherein the correction section is provided in the radio relay apparatus.

14. The communication system according to claim 10,
wherein the estimation section estimates the Doppler shift in the at least one of the radio communication of the service link and the radio communication of the feeder link based on flight schedule information predetermined for the radio relay apparatus.

15. The communication system according to claim 10,
wherein the estimation section estimates the Doppler shift based on at least one kind of information among information on a frequency shift of a downlink signal transmitted to the terminal apparatus via the radio relay apparatus, information on a directivity of an antenna forming the cell, information on a frequency shift of an uplink signal transmitted from the terminal apparatus via the radio relay apparatus, information on a time of changing position information of the radio relay apparatus, and flight schedule information predetermined for the radio relay apparatus.

16. The communication system according to claim 10,
wherein the radio relay apparatus is a slave repeater for performing a radio communication with a master repeater on the ground or on the sea, the master repeater being connected to a base station of a mobile communication, and
wherein each of the estimation section and the correction section is provided in the master repeater on the ground or on the sea, the slave repeater or the base station.

17. The communication system according to claim 10,
wherein the radio relay apparatus is a base station of a mobile communication, and
wherein each of the estimation section and the correction section is provided in the base station.

18. A communication system having a mobile-type radio relay apparatus that is disposed movably by flying in an upper airspace, forms a plurality of cells from an antenna at a predetermined altitude toward the ground or the sea, and performs a radio communication with a terminal apparatus located in each of the plurality of cells, the communication system comprising:
an estimation section for estimating a Doppler shift in at least one of a radio communication of a service link between the terminal apparatus located in the cell and the radio relay apparatus and a radio communication of a feeder link between the radio relay apparatus and a feeder station on the ground or on the sea; and
a correction section for correcting a frequency of the at least one of the radio communications based on an estimation result of the Doppler shift,
wherein the estimation section estimates the Doppler shift of the service link based on an uplink reference signal transmitted from the terminal apparatus for each of a plurality of terminal apparatuses located in the cell, and
wherein the correction section corrects the frequency of the radio communication in the service link between the terminal apparatus located in the cell and the radio relay apparatus, based on the statistical index value of the estimation value of the Doppler shift of the service link, the Doppler shift being estimated for the plurality of terminal apparatuses.

19. The communication system according to claim 18,
wherein the estimation section or the correction section determines a frequency offset for a radio communication of at least one of an uplink and a downlink of the service link for each of the cells, based on the estimation result of the Doppler shift, and wherein the correction section applies the frequency offset to the frequency of the radio communication for each of the cells.

20. The communication system according to claim 18, wherein the estimation section or the correction section determines a frequency offset for a radio communication of at least one of an uplink and a downlink of the feeder link, and determines a frequency offset for a radio communication of at least one of an uplink and a downlink of the service link for each of the cells, and wherein the correction section applies the frequency offset of the feeder link to a frequency of the radio communication of at least one of the uplink and the downlink of the feeder link, and applies the frequency offset of the service link to a frequency of the radio communication of at least one of the uplink and the downlink of the service link for each of the cells.

21. The communication system according to claim 19, wherein the correction section is provided in the radio relay apparatus.

22. The communication system according to claim 18, wherein the estimation section estimates the Doppler shift in the at least one of the radio communication of the service link and the radio communication of the feeder link based on flight schedule information predetermined for the radio relay apparatus.

23. The communication system according to claim 18, wherein the estimation section estimates the Doppler shift based on at least one kind of information among information on a frequency shift of a downlink signal transmitted to the terminal apparatus via the radio relay apparatus, information on a directivity of an antenna forming the cell, information on a frequency shift of an uplink signal transmitted from the terminal apparatus via the radio relay apparatus, information on a time of changing position information of the radio relay apparatus, and flight schedule information predetermined for the radio relay apparatus.

24. The communication system according to claim 18, wherein the radio relay apparatus is a slave repeater for performing a radio communication with a master repeater on the ground or on the sea, the master repeater being connected to a base station of a mobile communication, and wherein each of the estimation section and the correction section is provided in the master repeater on the ground or on the sea, the slave repeater or the base station.

25. The communication system according to claim 18, wherein the radio relay apparatus is a base station of a mobile communication, and wherein each of the estimation section and the correction section is provided in the base station.

26. A communication system comprising a radio relay apparatus that forms a plurality of cells from an antenna at a predetermined altitude toward the ground or the sea and performs a radio communication with a terminal apparatus located in each of the plurality of cells, the communication system comprising:

an estimation section for estimating a Doppler shift in a radio communication of a service link between the terminal apparatus and the radio relay apparatus for each of a plurality of terminal apparatuses located in the plurality of cells and grouping the plurality of terminal apparatuses according to a shift amount and a shift direction of the Doppler shift of each terminal apparatus; and a correction section for correcting a frequency in a radio communication of a service link between the terminal apparatus included in a terminal group and the radio relay apparatus for each terminal group, based on the estimation result of the Doppler shift for each of a plurality of terminal groups.

27. The communication system according to claim 26, wherein the correction section determines a resource allocation of an uplink from the terminal apparatus of the terminal group so that uplink signals between the plurality of terminal groups do not interfere with each other on a frequency axis due to the Doppler shift, based on the estimation result of the Doppler shift.

28. The communication system according to claim 26, wherein the estimation section or the correction section determines a frequency offset for an uplink radio communication of a service link between the terminal apparatus of the terminal group and the radio relay apparatus, based on the estimation result of the Doppler shift, and wherein the correction section applies the frequency offset to a frequency of the uplink radio communication for each of the terminal group.

29. The communication system according to claim 26, wherein the estimation section estimates the Doppler shift in the radio communication of the service link between the terminal apparatus and the radio relay apparatus, based on flight schedule information predetermined for the radio relay apparatus.

30. The communication system according to 26, wherein the correction section is provided in the radio relay apparatus.

31. The communication system according to claim 26, wherein the radio relay apparatus is a radio relay apparatus that is disposed movably by flying in an upper airspace.

32. The communication system according to claim 26, wherein the estimation section estimates the Doppler shift based on at least one kind of information among information on a frequency shift of a downlink signal transmitted to the terminal apparatus via the radio relay apparatus, information on a directivity of an antenna forming the cell, information on a frequency shift of an uplink signal transmitted from the terminal apparatus via the radio relay apparatus, information on a time of changing position information of the radio relay apparatus, and flight schedule information predetermined for the radio relay apparatus.

33. The communication system according to claim 26, wherein the radio relay apparatus is a slave repeater for performing a radio communication with a master repeater on the ground or on the sea, the master repeater being connected to a base station of a mobile communication, and wherein each of the estimation section and the correction section is provided in the master repeater on the ground or on the sea, the slave repeater or the base station.

34. The communication system according to claim 26, wherein the radio relay apparatus is a base station of a mobile communication, and wherein each of the estimation section and the correction section is provided in the base station.

35. A radio relay apparatus that forms a plurality of cells from an antenna at a predetermined altitude toward the ground or the sea, and performs a radio communication with a terminal apparatus located in each of the plurality of cells, the radio relay apparatus comprising:
- an estimation section for estimating a Doppler shift in a radio communication of a service link between the terminal apparatus and the radio relay apparatus for each of a plurality of terminal apparatuses located in the plurality of cells and grouping the plurality of terminal apparatuses according to a shift amount and a shift direction of the Doppler shift of each terminal apparatus; and
- a correction section for correcting a frequency of a radio communication between the terminal apparatus included in a terminal group and the radio relay apparatus for each terminal group based on an estimation result of the Doppler shift for each of a plurality of terminal groups.

36. The radio relay apparatus according to claim 16, wherein the radio relay apparatus is provided in a movable flying object that flies in an upper airspace.

* * * * *